US012809538B2

(12) United States Patent
Vijan et al.

(10) Patent No.: US 12,809,538 B2
(45) Date of Patent: Nov. 24, 2026

(54) NON-DISRUPTIVELY TRANSITION FROM ASYNCHRONOUS REPLICATION TO BI-DIRECTIONAL SYNCHRONOUS REPLICATION FOR A MULTI-SITE STORAGE SYSTEM

(71) Applicant: NetApp, Inc., San Jose, CA (US)

(72) Inventors: Anoop Vijan, Karnataka (IN); Sohan Shetty, Bangalore (IN); Dhruvil Shah, Bangalore (IN); Omprakash Khandelwal, Narayanapura Bangalore (IN); Akhil Kaushik, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/034,376

(22) Filed: Jan. 22, 2025

(65) Prior Publication Data

US 2025/0165167 A1 May 22, 2025

Related U.S. Application Data

(63) Continuation-in-part of application No. 18/320,788, filed on May 19, 2023, now Pat. No. 12,321,621, which is a continuation of application No. 17/219,759, filed on Mar. 31, 2021, now Pat. No. 11,934,670.

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01)

(58) Field of Classification Search
CPC .... G06F 3/0604; G06F 3/0619; G06F 3/0631; G06F 3/065; G06F 3/067
See application file for complete search history.

(56) References Cited

U.S. PATENT DOCUMENTS

| | | |
|---|---|---|
| 4,853,875 A | 8/1989 | Brown |
| 5,742,792 A | 4/1998 | Yanai et al. |

(Continued)

OTHER PUBLICATIONS

Non-Final Office Action mailed Jan. 17, 2023 for U.S. Appl. No. 17/881,381, filed Aug. 4, 2022, 18 pages.

(Continued)

*Primary Examiner* — Larry T MacKall
(74) *Attorney, Agent, or Firm* — Jaffery Watson; Hamilton & DeSanctis LLP

(57) ABSTRACT

A computer-implemented method comprises transitioning from a unidirectional asynchronous replication to initiating bi-directional synchronous replication between one or more storage objects of a first consistency group (CG1) of a primary storage site and one or more storage objects of a second consistency group (CG2) of a secondary storage site, converting the one or more storage objects of the CG2 from data protection read only access to read write access, and performing a reverse synchronization process between the one or more storage objects of the CG2 and the one or more storage objects of the CG1 including instantiating a reverse splitter on each volume of CG2, establishing reverse sync replication sessions for each storage object of the CG2, and allowing input output (IO) access to the one or more storage objects of the CG2.

20 Claims, 18 Drawing Sheets

(56) References Cited

U.S. PATENT DOCUMENTS

| | | | |
|---|---|---|---|
| 6,389,551 B1 | 5/2002 | Yount | |
| 6,415,372 B1 | 7/2002 | Zakai et al. | |
| 6,732,124 B1 | 5/2004 | Koseki et al. | |
| 7,039,827 B2 | 5/2006 | Meyer et al. | |
| 7,475,204 B2 | 1/2009 | Buah et al. | |
| 7,500,014 B1 | 3/2009 | Jacobson et al. | |
| 7,631,066 B1 | 12/2009 | Schatz et al. | |
| 7,640,451 B2 | 12/2009 | Meyer et al. | |
| 7,644,305 B2 | 1/2010 | Friedrich et al. | |
| 7,890,626 B1 | 2/2011 | Gadir | |
| 8,498,967 B1 | 7/2013 | Chatterjee et al. | |
| 8,645,623 B1 | 2/2014 | O'Shea et al. | |
| 8,856,583 B1 | 10/2014 | Visser et al. | |
| 8,874,960 B1 | 10/2014 | Khan et al. | |
| 9,189,341 B1 | 11/2015 | Natanzon et al. | |
| 9,983,823 B1 * | 5/2018 | Mritunjai | G06F 3/0604 |
| 10,412,066 B1 | 9/2019 | Vemuri | |
| 10,489,230 B1 | 11/2019 | Chen et al. | |
| 10,496,320 B2 | 12/2019 | Eisler et al. | |
| 10,725,691 B1 | 7/2020 | Kaushik et al. | |
| 10,761,768 B1 | 9/2020 | Kaushik et al. | |
| 11,036,423 B2 | 6/2021 | Kaushik et al. | |
| 11,089,105 B1 | 8/2021 | Karumbunathan et al. | |
| 11,327,857 B2 | 5/2022 | Bhargava et al. | |
| 11,360,867 B1 | 6/2022 | Subramanian et al. | |
| 11,409,622 B1 | 8/2022 | Kaushik et al. | |
| 11,481,139 B1 | 10/2022 | Vijayan et al. | |
| 11,537,314 B1 | 12/2022 | Subramanian et al. | |
| 11,550,679 B2 | 1/2023 | Kaushik et al. | |
| 11,675,503 B1 | 6/2023 | Ekins | |
| 11,892,982 B2 | 2/2024 | Subramanian et al. | |
| 11,893,261 B2 | 2/2024 | Narasingarayanapeta | |
| 11,893,264 B1 | 2/2024 | Vijayan et al. | |
| 11,934,670 B2 | 3/2024 | Subramanian et al. | |
| 12,045,491 B2 | 7/2024 | Subramanian et al. | |
| 12,050,558 B2 | 7/2024 | Subramanian et al. | |
| 12,321,621 B2 | 6/2025 | Subramanian et al. | |
| 12,578,896 B2 | 3/2026 | Subramanian et al. | |
| 2002/0132613 A1 | 9/2002 | Leung et al. | |
| 2003/0037029 A1 | 2/2003 | Holenstein et al. | |
| 2004/0153719 A1 | 8/2004 | Achiwa et al. | |
| 2004/0267809 A1 | 12/2004 | East et al. | |
| 2005/0229034 A1 | 10/2005 | Fujibayashi | |
| 2005/0270855 A1 | 12/2005 | Earhart et al. | |
| 2006/0095478 A1 | 5/2006 | Cherkauer et al. | |
| 2006/0136354 A1 | 6/2006 | Bell et al. | |
| 2006/0150006 A1 | 7/2006 | Mizutani | |
| 2006/0236048 A1 | 10/2006 | Deguchi et al. | |
| 2007/0016754 A1 | 1/2007 | Testardi | |
| 2007/0180307 A1 | 8/2007 | Zohar et al. | |
| 2007/0234006 A1 | 10/2007 | Radulescu et al. | |
| 2008/0201702 A1 | 8/2008 | Bunn | |
| 2009/0043979 A1 | 2/2009 | Jarvis | |
| 2009/0089609 A1 | 4/2009 | Baba | |
| 2009/0307530 A1 | 12/2009 | Tarta | |
| 2010/0064168 A1 | 3/2010 | Smoot et al. | |
| 2010/0082962 A1 | 4/2010 | Srinivasan et al. | |
| 2010/0161554 A1 | 6/2010 | Datuashvili et al. | |
| 2011/0106855 A1 | 5/2011 | Resch et al. | |
| 2011/0314148 A1 | 12/2011 | Petersen et al. | |
| 2012/0151249 A1 | 6/2012 | Swan et al. | |
| 2012/0259961 A1 | 10/2012 | Winokur | |
| 2013/0159620 A1 | 6/2013 | Sakashita et al. | |
| 2014/0298136 A1 | 10/2014 | Resch et al. | |
| 2015/0006949 A1 | 1/2015 | Bittles et al. | |
| 2015/0058838 A1 | 2/2015 | Tsirkin | |
| 2015/0378767 A1 | 12/2015 | Tarasuk-Levin et al. | |
| 2016/0063083 A1 | 3/2016 | Mu et al. | |
| 2016/0366226 A1 | 12/2016 | Friedman et al. | |
| 2017/0093983 A1 | 3/2017 | Everhart et al. | |
| 2018/0260125 A1 | 9/2018 | Botes et al. | |
| 2018/0352032 A1 | 12/2018 | Liu et al. | |
| 2018/0352037 A1 * | 12/2018 | Shang | H04L 67/148 |
| 2019/0004908 A1 | 1/2019 | Gopinath et al. | |
| 2019/0034286 A1 | 1/2019 | Brown et al. | |
| 2019/0129976 A1 | 5/2019 | Cha et al. | |
| 2019/0163373 A1 | 5/2019 | Compton et al. | |
| 2019/0212924 A1 | 7/2019 | Ward et al. | |
| 2019/0229978 A1 | 7/2019 | Rajvaidya et al. | |
| 2019/0347352 A1 | 11/2019 | Gochkov et al. | |
| 2019/0394266 A1 | 12/2019 | Fukuyama et al. | |
| 2020/0034258 A1 | 1/2020 | Avraham et al. | |
| 2020/0050495 A1 | 2/2020 | Voutilainen et al. | |
| 2020/0050587 A1 | 2/2020 | Kaushik et al. | |
| 2020/0081801 A1 | 3/2020 | Brown et al. | |
| 2020/0125460 A1 | 4/2020 | Selvaraj et al. | |
| 2020/0133520 A1 | 4/2020 | Patnaik et al. | |
| 2020/0233582 A1 * | 7/2020 | Chen | G06F 3/065 |
| 2020/0242130 A1 | 7/2020 | Chen et al. | |
| 2020/0273984 A1 | 8/2020 | Nakano et al. | |
| 2020/0274812 A1 | 8/2020 | Ouyang | |
| 2020/0278984 A1 | 9/2020 | Kaushik et al. | |
| 2020/0319982 A1 | 10/2020 | Rusev et al. | |
| 2021/0303165 A1 | 9/2021 | Kaushik et al. | |
| 2021/0374157 A1 | 12/2021 | Reddy et al. | |
| 2022/0019350 A1 | 1/2022 | Karr | |
| 2022/0121533 A1 | 4/2022 | Kumar et al. | |
| 2022/0284328 A1 | 9/2022 | Wang | |
| 2022/0317896 A1 | 10/2022 | Valan et al. | |
| 2022/0318104 A1 | 10/2022 | Bhargava et al. | |
| 2022/0318105 A1 | 10/2022 | Subramanian et al. | |
| 2022/0357855 A1 | 11/2022 | Narasingarayanapeta | |
| 2022/0374321 A1 | 11/2022 | Kaushik et al. | |
| 2023/0119175 A1 | 4/2023 | Kaushik et al. | |
| 2023/0161495 A1 | 5/2023 | Narasingarayanapeta | |
| 2023/0168834 A1 | 6/2023 | Narasingarayanapeta | |
| 2023/0289076 A1 | 9/2023 | Subramanian et al. | |
| 2024/0012575 A1 | 1/2024 | Narasingarayanapeta | |
| 2024/0385995 A1 | 11/2024 | Subramanian et al. | |
| 2024/0393973 A1 | 11/2024 | Subramanian et al. | |

OTHER PUBLICATIONS

Non-Final Office Action mailed on Apr. 13, 2023 for U.S. Appl. No. 18/066,775, filed Dec. 15, 2022, 16 pages.

Non-Final Office Action mailed on Aug. 30, 2024 for U.S. Appl. No. 18/320,788, filed May 19, 2023, 08 pages.

Non-Final Office Action mailed on Feb. 17, 2023 for U.S. Appl. No. 17/510,795, filed Oct. 26, 2021, 11 pages.

Non-Final Office Action mailed on Mar. 16, 2023 for U.S. Appl. No. 17/970,961, filed Oct. 21, 2022, 6 pages.

Notice of Allowance mailed Dec. 13, 2022 for U.S. Appl. No. 17/219,815, filed Mar. 31, 2021.

Notice of Allowance mailed Nov. 2, 2022 for U.S. Appl. No. 17/495,990, filed Oct. 7, 2021,8 pages.

Notice of Allowance mailed Nov. 18, 2022 for U.S. Appl. No. 17/219,812, filed Mar. 31, 2021, 12 pages.

Notice of Allowance mailed Oct. 31, 2022 for U.S. Appl. No. 17/219,812, filed Mar. 31, 2021, 9 pages.

Notice of Allowance mailed on Apr. 7, 2023 for U.S. Appl. No. 17/219,740, filed Mar. 31, 2021, 7 pages.

Notice of Allowance mailed on Feb. 2, 2024 for U.S. Appl. No. 17/219,759, filed Mar. 31, 2021, 05 pages.

Notice of Allowance mailed on Jan. 2, 2024 for U.S. Appl. No. 17/505,962, filed Oct. 20, 2021, 02 pages.

Notice of Allowance mailed on Jan. 13, 2025 for U.S. Appl. No. 18/320,788, filed May 19, 2023, 09 pages.

Notice of Allowance mailed on Jun. 14, 2023 for U.S. Appl. No. 17/505,962, filed Oct. 20, 2021, 8 pages.

Notice of Allowance mailed on Mar. 3, 2023 for U.S. Appl. No. 17/219,815, filed Mar. 31, 2021, 5 pages.

Notice of Allowance mailed on Mar. 13, 2024 for U.S. Appl. No. 18/053,561, filed Nov. 8, 2022, 08 pages.

Notice of Allowance mailed on Mar. 20, 2023 for U.S. Appl. No. 17/219,740, filed Mar. 31, 2021, 11 pages.

Notice of Allowance mailed on May 31, 2024 for U.S. Appl. No. 18/448,325, filed Aug. 11, 2023, 8 pages.

Notice of Allowance mailed on Sep. 20, 2023 for U.S. Appl. No. 17/219,759, filed Mar. 31, 2021, 07 pages.

(56) References Cited

OTHER PUBLICATIONS

Notice of Allowance mailed on Sep. 20, 2023 for U.S. Appl. No. 17/505,962, filed Oct. 20, 2021, 08 pages.
Pan L, "Paxos at Its Heart is Very Simple," Distributed System, 2018, Retrieved From : URL: https://blog.the-pans.com/paxos-explained/, pp. 1-12.
U.S. Non-Final Office action dated Dec. 21, 2021 in U.S. Appl. No. 17/238,829, filed Apr. 23, 2021, 20 pages.
U.S. Notice of Allowance dated Apr. 6, 2022 in U.S. Appl. No. 17/238,829, filed Apr. 23, 2021, 9 pages.
U.S. Notice of Allowance mailed Jun. 24, 2022 in U.S. Appl. No. 17/219,816, filed Mar. 31, 2021, 8 pages.
U.S. Notice of Allowance mailed May 6, 2022 in U.S. Appl. No. 17/219,746, filed Mar. 31, 2021, 18 pages.
U.S. Notice of Allowance mailed Oct. 26, 2022 in U.S. Appl. No. 17/219,812, filed Mar. 31, 2021, 9 pages.
Non-Final Office Action mailed on Jun. 9, 2025 for U.S. Appl. No. 18/673,753, filed May 24, 2024, 12 pages.
Non-Final Office Action mailed on Nov. 20, 2025 for U.S. Appl. No. 18/787,654, filed Jul. 29, 2024, 21 pages.
Notice of Allowance mailed on Apr. 13, 2026 for U.S. Appl. No. 18/787,654, filed Jul. 29, 2024, 09 pages.
Notice of Allowance mailed on Nov. 19, 2025 for U.S. Appl. No. 18/673,753, filed May 24, 2024, 08 pages.

* cited by examiner

NON-DISRUPTIVELY TRANSITION FROM ASYNCHRONOUS REPLICATION TO BI-DIRECTIONAL SYNCHRONOUS REPLICATION FOR A MULTI-SITE STORAGE SYSTEM

RELATED APPLICATIONS

This application is a continuation-in-part of U.S. patent application Ser. No. 18/320,788, filed May 19, 2023, which is a continuation of U.S. patent application Ser. No. 17/219,759, filed Mar. 31, 2021, which are each hereby incorporated by reference in its entirety for all purposes.

FIELD

Various embodiments of the present disclosure generally relate to multi-site distributed data storage systems. In particular, some embodiments relate to non-disruptively transitioning from a unidirectional asynchronous replication to bi-directional synchronous replication in a multi-site storage system.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

For various use cases, for example, involving data protection and data migration, it is desirable to efficiently and effectively manage a unit of storage objects/volumes as a single unit.

SUMMARY

Systems and methods are described for efficiently performing various operations at the granularity of a consistency group within a cross-site storage solution. According to one embodiment, a distributed storage system preserves dependent write-order consistency on a mirror copy by taking all members OOS when any member becomes OOS. A first volume of multiple volumes that are members of a local consistency group of the distributed storage system is detected to be in the OOS state with respect to the mirror copy of a dataset associated with the local consistency group that is maintained on corresponding volumes that are members of a remote consistency group of a remote distributed storage system. Access to data stored on the first volume is temporarily disallowed. A consensus protocol request is broadcast, on behalf of the first volume, to the local consistency group. Responsive to receipt of a first phase communication associated with the consensus protocol request directed to a given volume: (i) access to data stored on the given volume is temporarily disallowed, (ii) the first phase communication is acknowledged, and (iii) responsive to receipt of a second phase communication associated with the consensus protocol request directed to a particular volume, the particular volume is placed in in the OOS state and access to the data stored on the particular volume is permitted.

In another embodiment, a distributed storage system facilitates creation of a common write-order consistent snapshot between a local consistency group and a remote consistency group. The distributed storage system receives a request to create a common snapshot between a local consistency group including multiple volumes hosted by the distributed storage system and a remote consistency group on a remote distributed storage system that is protecting the local consistency group. A first consensus protocol request is sent on behalf of a first volume of the multiple volumes to the local consistency group. Responsive to receipt, on behalf of a given volume of the multiple volumes, of the first consensus protocol request: (i) access to data stored on the given volume is temporarily disallowed, (ii) independently and in parallel, a first snapshot of the data stored on the given volume and a second snapshot of data stored on the corresponding volume of the remote consistency group are caused be created in a dependent write-order consistent manner, and (iii) a response is sent to the first volume after the first snapshot and the second snapshot have been created, sending a response to the first volume. Responsive to receipt, on behalf of the first volume, of responses from all of the volumes, each of the volumes are caused to start allowing access to their respective data by sending a second consensus protocol request to the local consistency group.

In another embodiment, a computer-implemented method comprises transitioning from an asynchronous replication to initiating bi-directional synchronous replication including a forward synchronization process from one or more storage objects of a first consistency group (CG1) of a primary storage site to one or more storage objects of a second consistency group (CG2) of a secondary storage site, converting the one or more storage objects of the CG2 from data protection read only access to read write access, and performing a reverse synchronization process from the one or more storage objects of the CG2 to the one or more storage objects of the CG1 including instantiating a reverse splitter on each volume of CG2, establishing reverse sync replication sessions for each storage object of the CG2, and allowing input output (IO) access to the one or more storage objects of the CG2.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
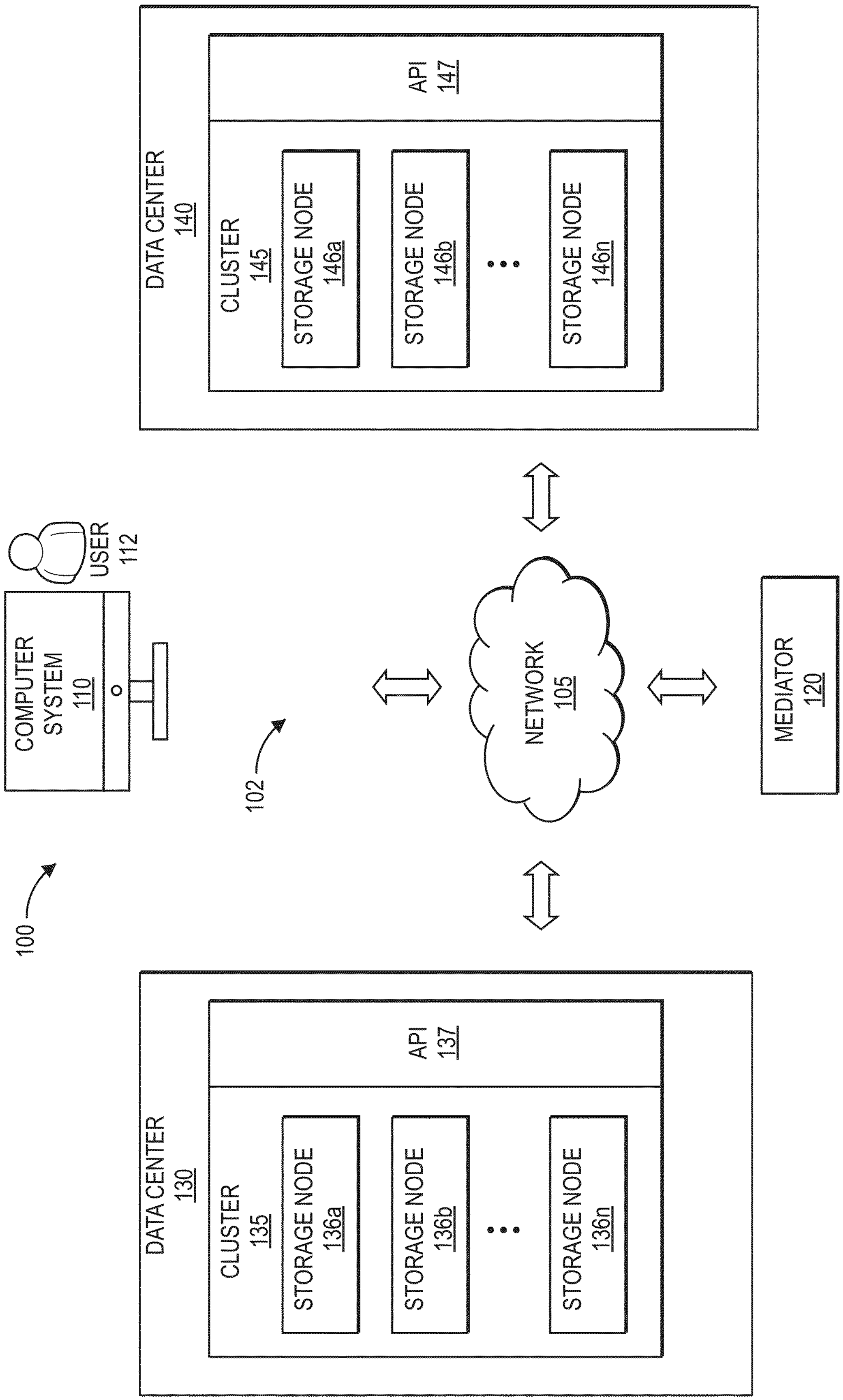
FIG. 1 is a block diagram illustrating an environment in which various embodiments may be implemented.

Systems and methods are described for efficiently performing various operations at the granularity of a consistency group within a cross-site storage solution. In the context of cross-site storage solutions (including cross-site HA storage solutions that perform synchronous data replication to support zero recovery time objective (RTO) protection and cross-site asynchronous DR solutions), a certain degree of consistency over time is maintained between a mirror copy and a primary dataset depending upon the particular implementation. Certain operations on a set of data containers/volumes (referred to herein as a consistency group (CG)) hosting the data at issue should be managed as a single unit. Additionally, as a CG is a distributed object, a coordinated process should be used to ensure dependent write-order consistency of the mirror copy. For example, responsive to any member volume of a CG becoming out-of-synchronization (OOS) with respect to a peered volume, in one embodiment, the CG as a whole should be taken OOS to preserve dependent write-order consistency of the mirror copy.

Various use cases, including asynchronous protection, synchronous protection, and planned migration may benefit from the use of CGs. For example, in support of asynchronous protection, a dataset associated with one or more volumes that are members of a local CG of a primary distributed storage system may be periodically transferred to a mirror copy associated with a remote CG of the secondary distributed storage system. This periodic transfer should provide a consistent image of the dataset across all members of a CG and should be transferred in an atomic fashion (all or nothing). In the meantime, the mirror copy may expose a view from the last known CG consistent point (e.g., from the last transfer, such as a baseline snapshot).

With respect to synchronous protection, the mirror copy should always be consistent with the dataset. As a result, any failures associated with synchronous replication should be handled in such a manner that the mirror copy remains consistent. Also, in order to support recovery from, among other potential disruptive events, manual planned disruptive events (e.g., balancing of CG members across a cluster) a resynchronization process should be provided to promptly bring the CG back into a steady state of in-synchronization (InSync) from an OOS state; and ideally a failure of any particular member volume of a CG to achieve the steady state of InSync during any particular attempt of the resynchronization process will not affect the ability on the part of other member volumes to come to the steady state of InSync. Finally, in support of snapshot replication for synchronous protection and to facilitate on-demand creation of snapshots by an application associated with a CG, an efficient process for creating a common snapshot of all or a subset of the peered member volumes of the CG at both a local and a remote location should be provided.

Embodiments described herein seek to improve various technological processes associated with cross-site storage solutions and ensure the process of reinstating a mediator to the role of an arbitrator does not cause correctness issues. Various embodiments of the present technology provide for a wide range of technical effects, advantages, and/or improvements to stretched storage systems and participating distributed storage systems. For example, various embodiments may include one or more of the following technical effects, advantages, and/or improvements: (i) independently bringing individual volumes of a CG to a steady state (InSync); (ii) preserving dependent write-order consistency when a remote mirror copy goes OOS for any reason (e.g., a network failure) by driving all member volumes OOS responsive to any member volume becoming OOS; and (iii) independent creation of snapshots by member volumes to support taking of a common snapshot. One or more of which may include various additional optimizations described further below.

While some embodiments of the present disclosure are described herein with reference to particular usage scenarios in the context of cross-site HA storage solutions, it is to be noted that various embodiments of the present disclosure are applicable to various use cases that arise in the context of cross-cite storage solutions more generally, including cross-site asynchronous DR solutions.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes **136*a-n* and an Application Programming Interface (API) 137. In the context of the present example, the multiple storage nodes 136*a-n* are organized as a cluster and provide a distributed storage architecture to service storage requests issued by one or more clients (not shown) of the cluster. The data served by the storage nodes 136*a-n* may be distributed across multiple storage units embodied as persistent storage devices, including but not limited to HDDs, SSDs, flash memory systems, or other storage devices. In a similar manner, cluster 145 includes multiple storage nodes 146*a-n* and an Application Programming Interface (API) 147. In the context of the present example, the multiple storage nodes 146*a-n*** are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
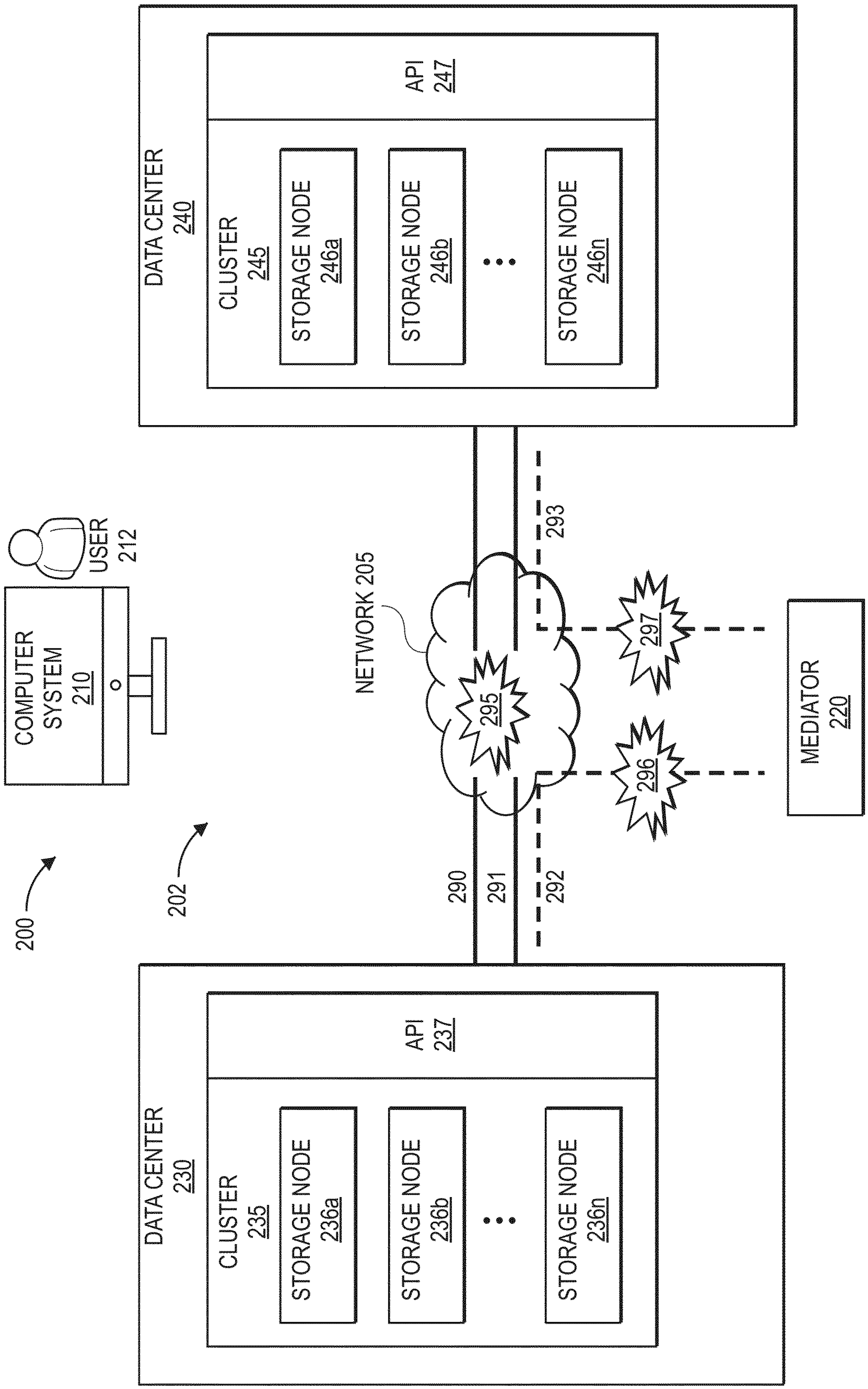
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236*a-b*, optionally includes additional storage nodes (e.g., 236*n*) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246*a-b*, optionally includes additional storage nodes (e.g., 246*n*) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
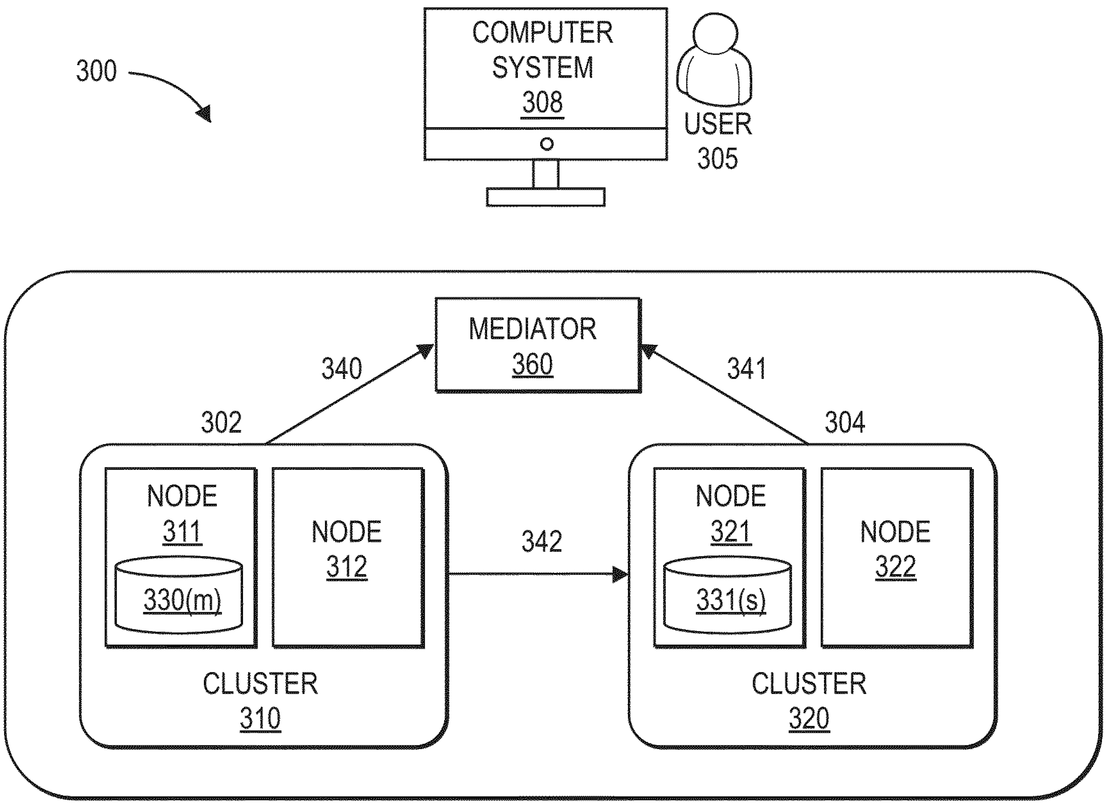
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 305) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a master and the node 321 is designated as a slave. The master is given preference to serve I/O commands to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O commands to requesting clients, then this forms a strong consensus.

The master and slave roles for the clusters 310 and 320 help to avoid a split-brain situation with both of the clusters simultaneously attempting to serve I/O commands. There are scenarios where both master and slave copies can claim to be a master copy. For example, a recovery post failover or failure during planned failover workflow can results in both clusters 310 and 320 attempting to serve I/O commands. In one example, a slave cannot serve I/O until an AUFO happens. A master doesn't serve I/O commands until the master obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
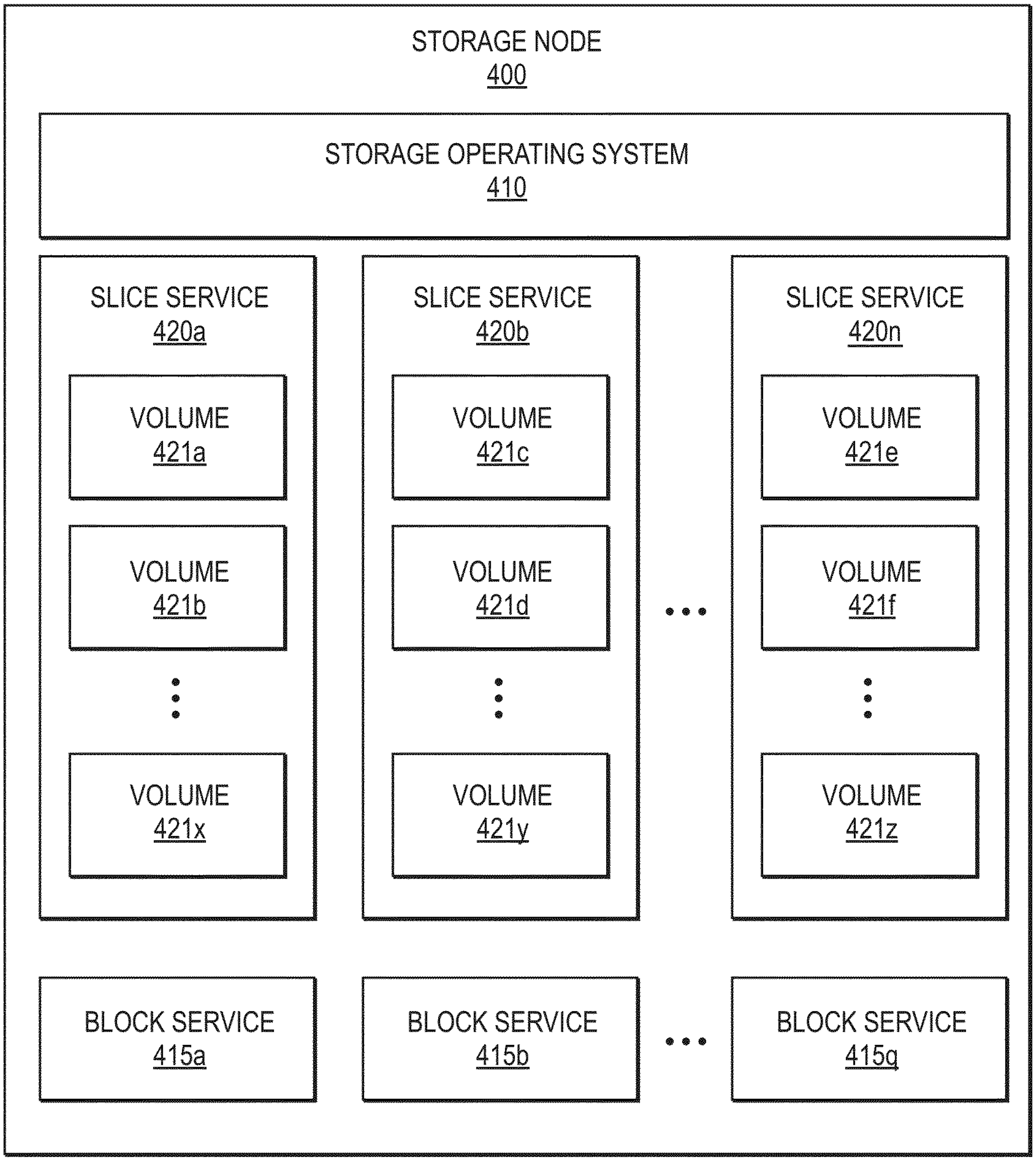
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136*a-n*, 146*a-n*, 236*a-n*, 246*a-n*, 311, 312, 331, 322, 712, 714, 752, 754) described herein. In the context of the present example, storage node 400 includes a storage operating system 410, one or more slice services 420*a-n*, and one or more block services 415*a-q*. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a-x*, volumes 421*c-y*, and volumes 421*e-z*). Client systems (not shown) associated with an enterprise may store data to one or more volumes, retrieve data from one or more volumes, and/or modify data stored on one or more volumes.

The slice services 420*a-n* and/or the client system may break data into data blocks. Block services 415*a-q* and slice services 420*a-n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a-n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a-q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
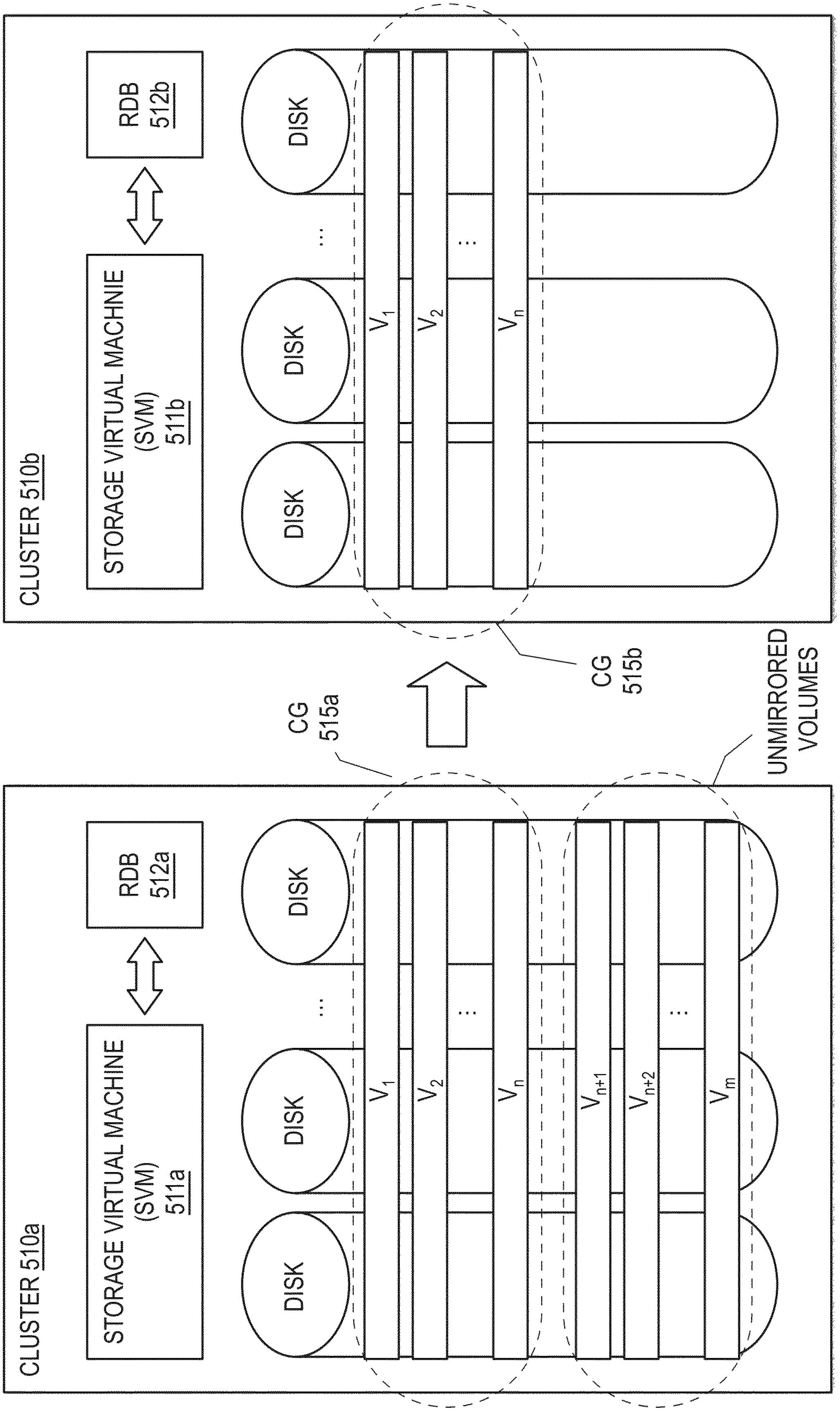
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 510*a* and 510*b*, which may be analogous to cluster 110*a* and 110*b*, respectively) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 510*a* may be operable within a first site (e.g., a local data center) and cluster 510*b* may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515*a* or CG 515*b*). A CG is a collection of storage objects or data containers (e.g., volumes) within a cluster that are managed by a Storage Virtual Machine (e.g., SVM [511*a* or SVM 511*b*) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515*a* may be referred to as a local CG from the perspective of cluster 510*a* and as a remote CG from the perspective of cluster 510*b*. Similarly, CG 515*a* may be referred to as a remote CG from the perspective of cluster 510*b* and as a local CG from the perspective of cluster 510*a*. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512*a* and 512*b*), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 515*b*) to which data is configured to be synchronously replicated may be referred to as being in the role of a destination CG, whereas the CG (e.g., CG 515*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary (master) cluster is stored on more than one secondary (slave) cluster.

The various nodes (e.g., storage nodes 136*a-n*, storage node 236*a*-236*n*, etc.) of the distributed storage systems described herein, and the processing described below with reference to the flow diagrams of FIGS. 7, 9 and 10 may be implemented in the form of executable instructions stored on a machine readable medium (e.g., non-transitory computer-readable medium) and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 11 below.

Figure 6A:
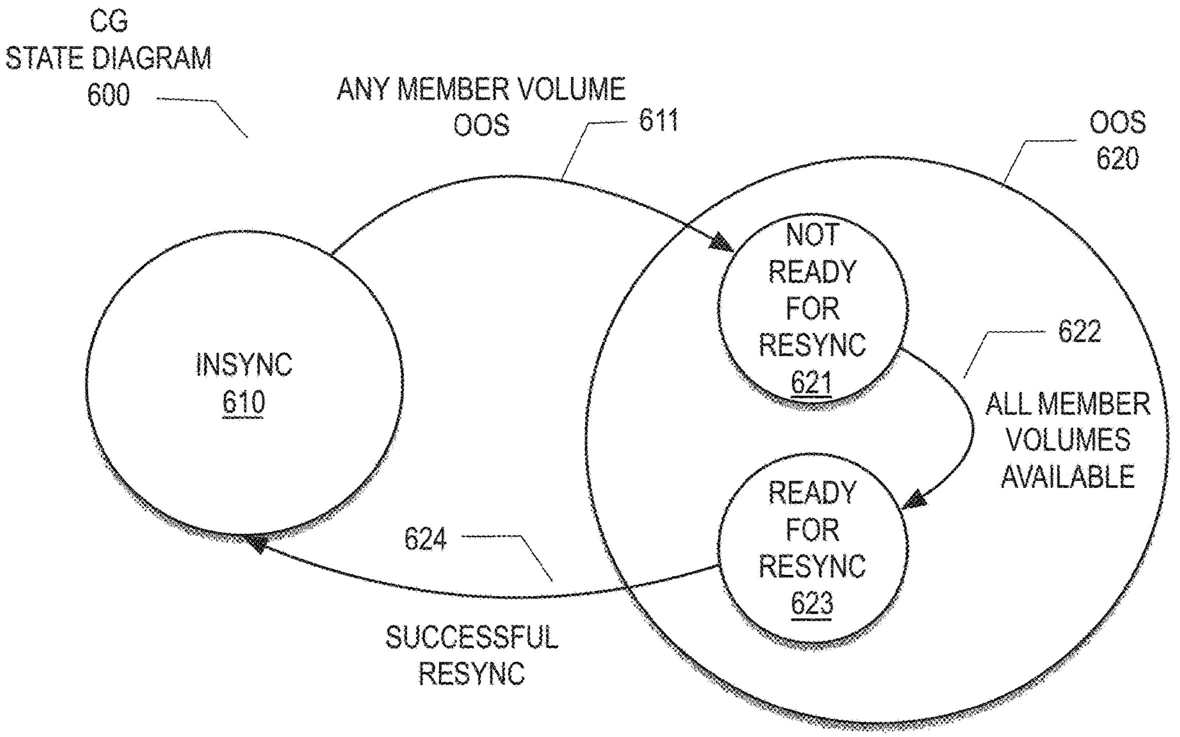
FIG. 6A is a CG state diagram in accordance with an embodiment of the present disclosure.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512*a* or 512*b*).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 624 from the ready for resync state 623 to the InSync state. A non-limiting example of a CG resynchronization process is described below with reference to FIG. 7.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

Figure 6B:
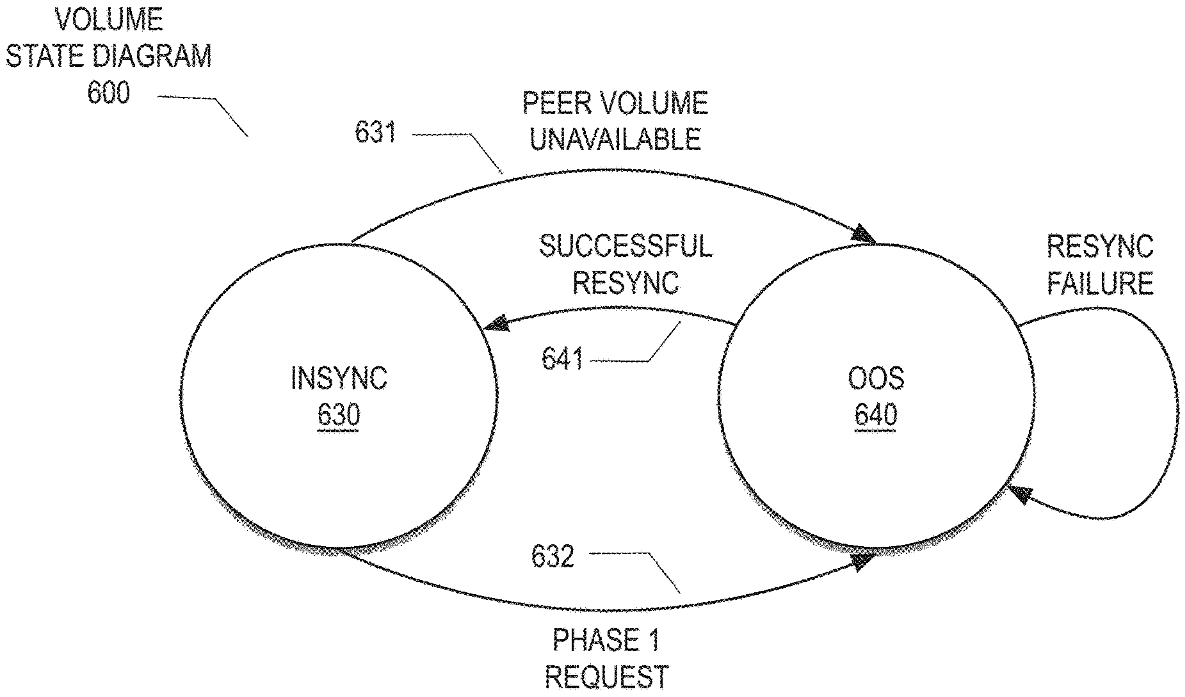
FIG. 6B is a volume state diagram in accordance with an embodiment of the present disclosure.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515*a*) is in the InSync state, the given volume may be said to be in-synchronization with a peer volume of a remote CG (e.g., CG 515*b*) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512*a* or 512*b*).

A given volume may transition 631 from the InSync state to the OOS state responsive to a peer volume being unavailable. A given volume may transition 641 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS. In the context of the present example, a given volume may transition 632 from the InSync state to the OOS state responsive to receipt of a phase 1 request of a three-way handshake of a consensus protocol request. For example, as described further below with reference to FIG. 8, transitioning to the OOS state during an intermediate stage of a consensus protocol request, represents an optimization that allows a single consensus protocol request to drive the given CG OOS rather than requiring the use of multiple consensus protocol requests.

CG Resynchronization

Figure 7:
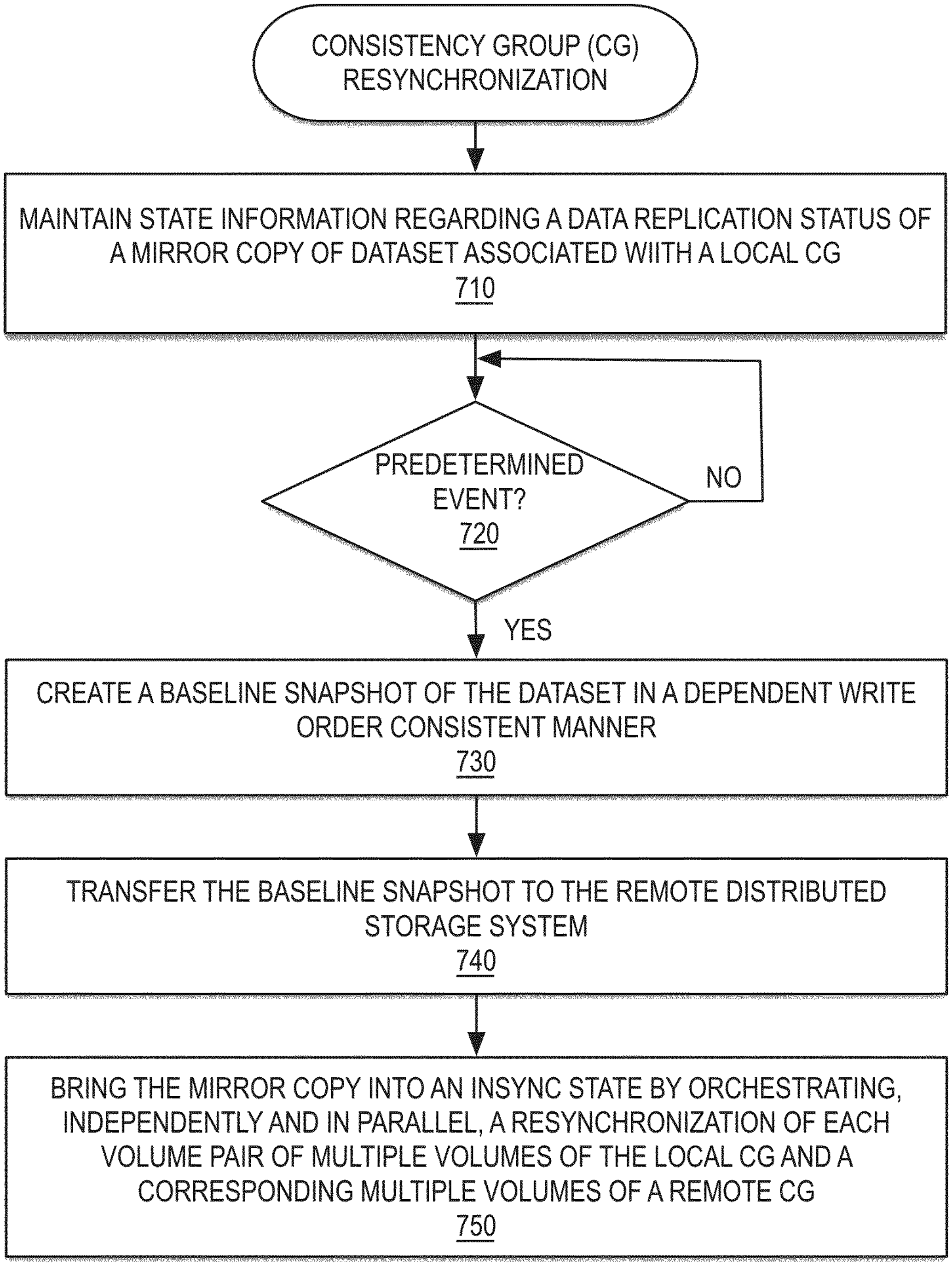
FIG. 7 is a flow diagram illustrating a set of operations for performing CG resynchronization in accordance with an embodiment of the present disclosure.

FIG. 7 is a flow diagram illustrating a set of operations for performing CG resynchronization in accordance with an embodiment of the present disclosure. In the context of the present example, it is assumed a peered pair of CGs, including a local CG (e.g., CG 515*a*) of a distributed storage system (e.g., cluster 510*a*) and a remote CG (e.g., CG 515*b*), has been in an OOS state (e.g., OOS 620) for a period of time, meaning the mirror copy hosted by the member volumes of the remote CG is out-of-synchronization with respect to the primary dataset hosted by the member volumes of the local CG. Depending upon the nature of the data replication being performed (e.g., asynchronous or synchronous) and the particular implementation, a CG resynchronization may be performed responsive to a predetermined event to bring the CG back into an InSync state (e.g., InSync 610).

At block 710, state information regarding a data replication status of a mirror copy of a dataset associated with a local CG may be maintained, for example, to facilitate automatic triggering of CG resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

At decision block 720, it is determined whether a predetermined event has occurred. If so, then processing continues with block 730; otherwise, processing loops back to decision block 720. According to one embodiment, the predetermined event represents all peer volumes of a remote CG corresponding to the member volumes of the local CG being available (e.g., reachable via communications via a network coupling the distributed storage system with the remote distributed storage system). In alternative embodiments, CG resynchronization may be triggered by other means, for example, via a command issued by an administrative user of the cross-site storage solution of which the distributed storage system and the remote distributed storage system are a part). Also, a change in network availability from unavailable to available may trigger resynchronization. For example, a network subsystem may notify the subsystem responsible for performing resynchronization regarding network availability for a particular peer cluster and based on that resynchronization subsystem can trigger resynchronization for any configured CG relationships that are flagged as OOS.

At block 730, a baseline snapshot (which may also be referred to as a consistent view snapshot) of the dataset is created in a dependent write-order consistent manner. According to one embodiment, the baseline snapshot is created at the local CG an asynchronous transfer (e.g., block 740) is subsequently performed to transfer the content to the remote CG, while allowing operations to continue on the member volumes of the local CG. The baseline snapshot may be created by pausing I/O to all member volumes of the local CG, creating the baseline snapshot for all member volumes, and then unpausing the I/Os.

At block 740, the baseline snapshot is transferred to the remote distributed storage system.

At block 750, the mirror copy is brought into an InSync state by orchestrating, independently and in parallel, a resynchronization of each volume pair of member volumes of the local CG and the corresponding member volumes of the remote CG. Advantageously, this independent and parallel resynchronization approach contributes to scalability of CGs by supporting CGs with a large number of member volumes without requiring a change to the resynchronization process.

According to one embodiment, while the resynchronization process remains incomplete, the access to the mirror copy may allowed, but only to a last known CG consistent point. For example, a baseline snapshot once transferred (e.g., at block 740) becomes the last known CG consistent point.

According to one embodiment, within a particular CG one volume may be considered the monarch volume. The node within the cross-site storage solution that hosts the monarch volume may be considered the monarch node. The monarch node may orchestrate the resynchronization of each individual member volume. During the resynchronization process, the monarch node may ensure no write-order inconsistent view is provided on the mirror copy, even if certain member volumes achieve the InSync state prior to the others. After all the member volumes have achieved the InSync state, the monarch node may allow the application associated with the CG to view and/or access the InSync mirror copy on the remote location, which is guaranteed to be write-order consistent.

For purposes of clarifying the difference between a master node and a monarch node, in various embodiments described herein, there is one master node per distributed storage system and one monarch node per CG.

While in the context of the present example, more individual parallel transfers of data may be involved as a result of performing the resynchronization independently on a volume-by-volume basis, advantageously, a failure during the resynchronization of one member volume of the CG will not affect the ability of any of the other member volumes to come to the steady state of InSync. In this manner, when a restart of the resynchronization process is performed due to such a failure, the subsequent resynchronization may exclude those member volumes that are already in the InSync state and need only be retried for those that remain in the OOS state. Another perceived advantage of the CG resynchronization approach described above is the limited number of coordination points, including creation of the consistent view snapshot and bringing all the member volumes into the InSync state. As such, the CG resynchronization process is expected to be faster and involve fewer error scenarios than alternative approaches.

Preservation of Dependent Write-Order Consistency

In accordance with various embodiments, as a CG represents a distributed object within a cross-site storage solution, efforts are undertaken to ensure dependent write-order consistency of the mirror copy. For example, responsive to any member volume of a CG becoming out-of-synchronization (OOS) with respect to a peer volume, the CG as a whole is taken OOS to preserve dependent write-order consistency of the mirror copy.

Figure 8:
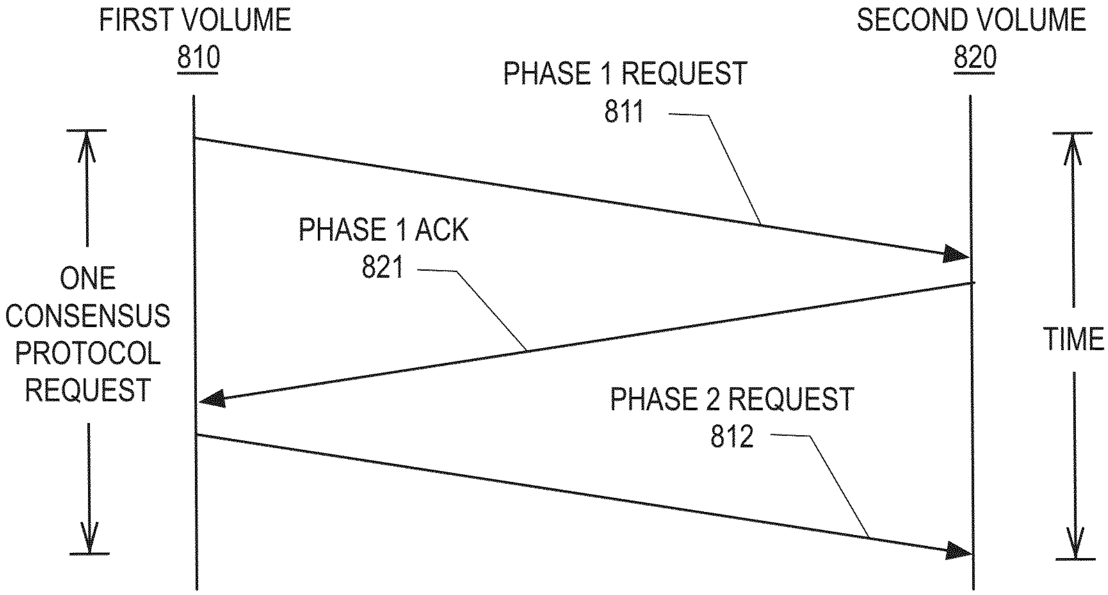
FIG. 8 is a simplified message sequence diagram illustrating the use of a single consensus protocol request to preserve dependent write-order consistency by taking a CG out-of-synchronization (OOS) in accordance with an embodiment of the present disclosure.

FIG. 8 is a simplified message sequence diagram illustrating the use of a single consensus protocol request to preserve dependent write-order consistency by taking a CG out-of-synchronization (OOS) in accordance with an embodiment of the present disclosure. Certain optimizations are implemented in various embodiments to reduce the complexity and/or the amount of time to achieve a particular result. The present example seeks to illustrate one such optimization involving the use of one consensus protocol request (e.g., a request issued by an implementation of the Paxos family of protocols for solving consensus) to efficiently place all member volumes into an OOS state (e.g., OOS 640) responsive to any member volume of the CG transitioning into the OOS state. In this manner, replication of data between corresponding pairs of volumes may be temporarily halted to preserve dependent write-order consistency until the CG can be brought back into an InSync state (e.g., InSync 610).

While for simplicity, only two member volumes (e.g., a first volume 810 and a second volume 820) of a CG are described in the context of the present example, it is to be understood that a CG may include more member volumes. In the context of the present example, it is assumed the first volume 810 has become OOS with respect to its peer volume of the remote CG. Responsive to detecting this condition, in one embodiment, a single consensus protocol request is used to cause all other member volumes (in this case, the second volume 820) to transition into the OOS state. A more traditional approach would involve the use of two consensus protocol requests to cause all other member volumes to transition into the OOS state in which the first consensus protocol request would be used to cause each member volume to stop data access to itself and the second consensus protocol request would be used to cause each member volume to take the mirror copy OOS and start allowing local data access.

Rather than following the more traditional approach, in the context of the present example, member volumes are operable to take action responsive to an intermediate stage of the single consensus protocol request so as to reduce I/O disruption and/or the amount of time otherwise required to resume I/O. As shown in FIG. 8, the single consensus protocol request involves a three-way handshake, including a phase 1 request 811 broadcast on behalf of the first volume 810, a phase 1 acknowledgement (ACK) 821 broadcast on behalf of the second volume 820, and a phase 2 request 812 broadcast on behalf of the first volume 810. The phase 1 request 111 may represent a vote request/phase used to confirm each member is available in the group and ready to receive the phase 2 request 812. The phase 1 ACK may be used to acknowledge the vote in favor of receiving the phase 2 request 812. As described further below with reference to FIG. 9, receipt of the phase 1 request 811 may cause each member volume to stop data access to itself and receipt of the phase 2 request 812 may cause each member volume to take the mirror copy OOS and start allowing local data access. As such, I/O disruption that would typically span the time it takes to perform two consensus protocol requests may be reduced by one half by leveraging the phase 1 request 811 (e.g., the vote phase) as one step to start the OOS process by causing the member volumes to stop I/O access.

Figure 9:
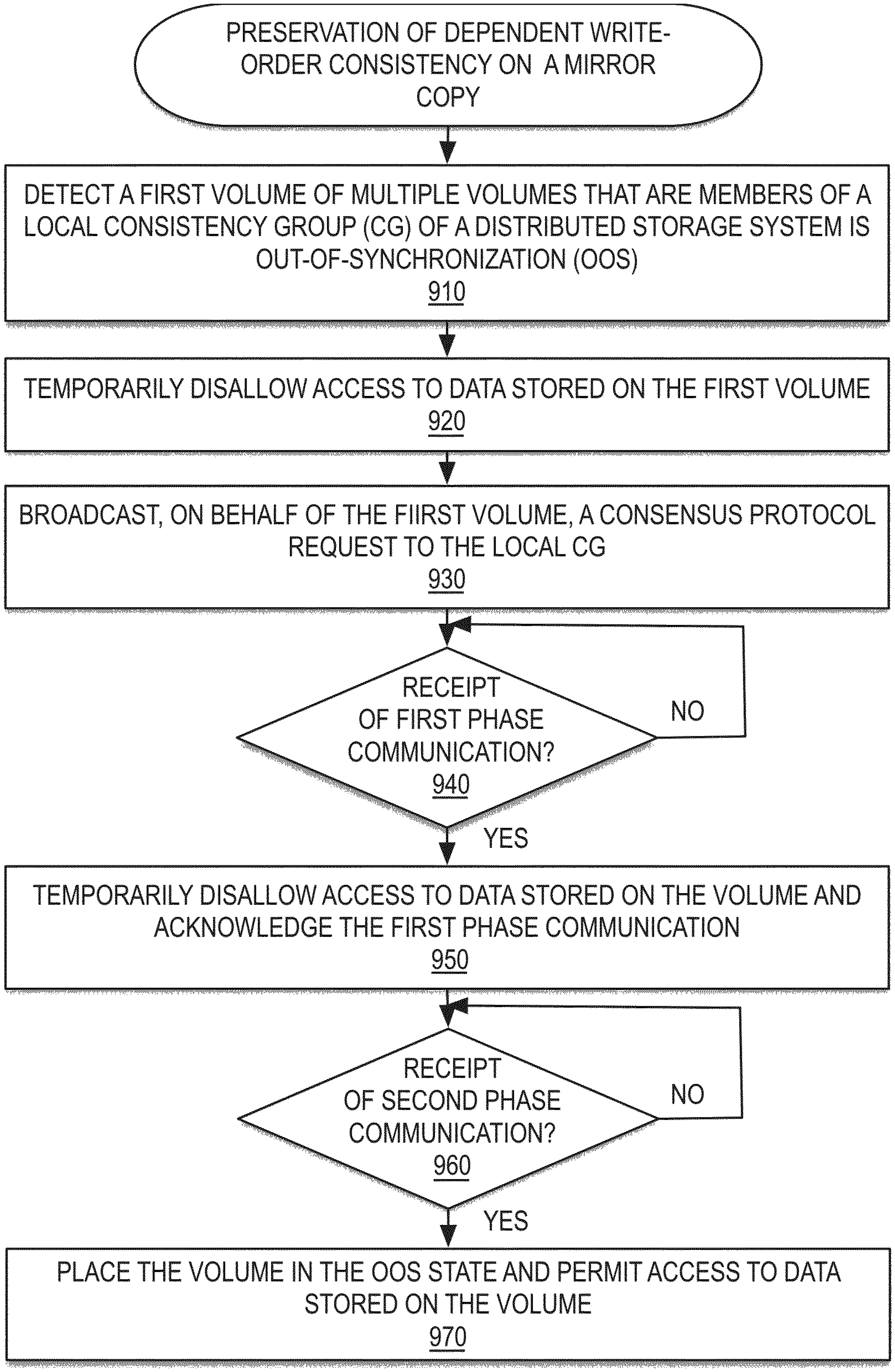
FIG. 9 is a flow diagram illustrating a set of operations for preservation of dependent write-order consistency on a mirror copy in accordance with an embodiment of the present disclosure.

FIG. 9 is a flow diagram illustrating a set of operations for preservation of dependent write-order consistency on a mirror copy in accordance with an embodiment of the present disclosure. At block 910, it is detected that a first volume (e.g., first volume 810) of a local CG (e.g., CG 515*a*) of a distributed storage system (e.g., cluster 510*a*) is in an OOS state (e.g., OOS 640). Responsive to detecting this condition, at block 920, access to data stored on the first volume is temporarily disabled. According to one embodiment, responses to any completed operations may be held until this distributed transaction completes so as prevent any dependent writes from entering any member volume of the local CG. Alternatively, the I/O operations themselves may be held to accomplish the same objective, albeit, with potentially higher latency. An advantage of the former approach over the latter approach is that the processing of I/O operations is allowed to complete with only the corresponding responses being held while the distributed transaction is taking place. Then, once the distributed transaction completes, the held responses may be released resulting in no additional latency.

At block 930, a single consensus protocol request is broadcast to the local CG on behalf of the first volume.

At decision block 940, a given member volume of the local CG determines whether a first phase communication (e.g., the phase 1 request 811) of the consensus protocol request has been received. If so, processing continues with block 950; otherwise, processing loops back to decision block 940.

At block 950, responsive to receipt of the first phase communication on behalf of the given member volume, access to data stored on the given volume is temporarily disallowed and the first phase communication is acknowledged (e.g., the phase 1 ACK 821).

At decision block 960, a given member volume of the local CG determines whether a second phase communication (e.g., the phase 2 request 812) of the consensus protocol request has been received. If so, processing continues with block 970; otherwise, processing loops back to decision block 960.

At block 970, responsive to receipt of the second phase communication on behalf of the given member volume, the given volume is placed into the OOS state and I/O is resumed by permitting local access to data stored on the given volume. In this manner, what would more traditionally be performed with two consensus protocol requests may be accomplished with a single consensus protocol request by leveraging an intermediate phase of the consensus protocol to trigger part of the OOS process.

Creation of a Common Write-Order Consistent Snapshot

Figure 10:
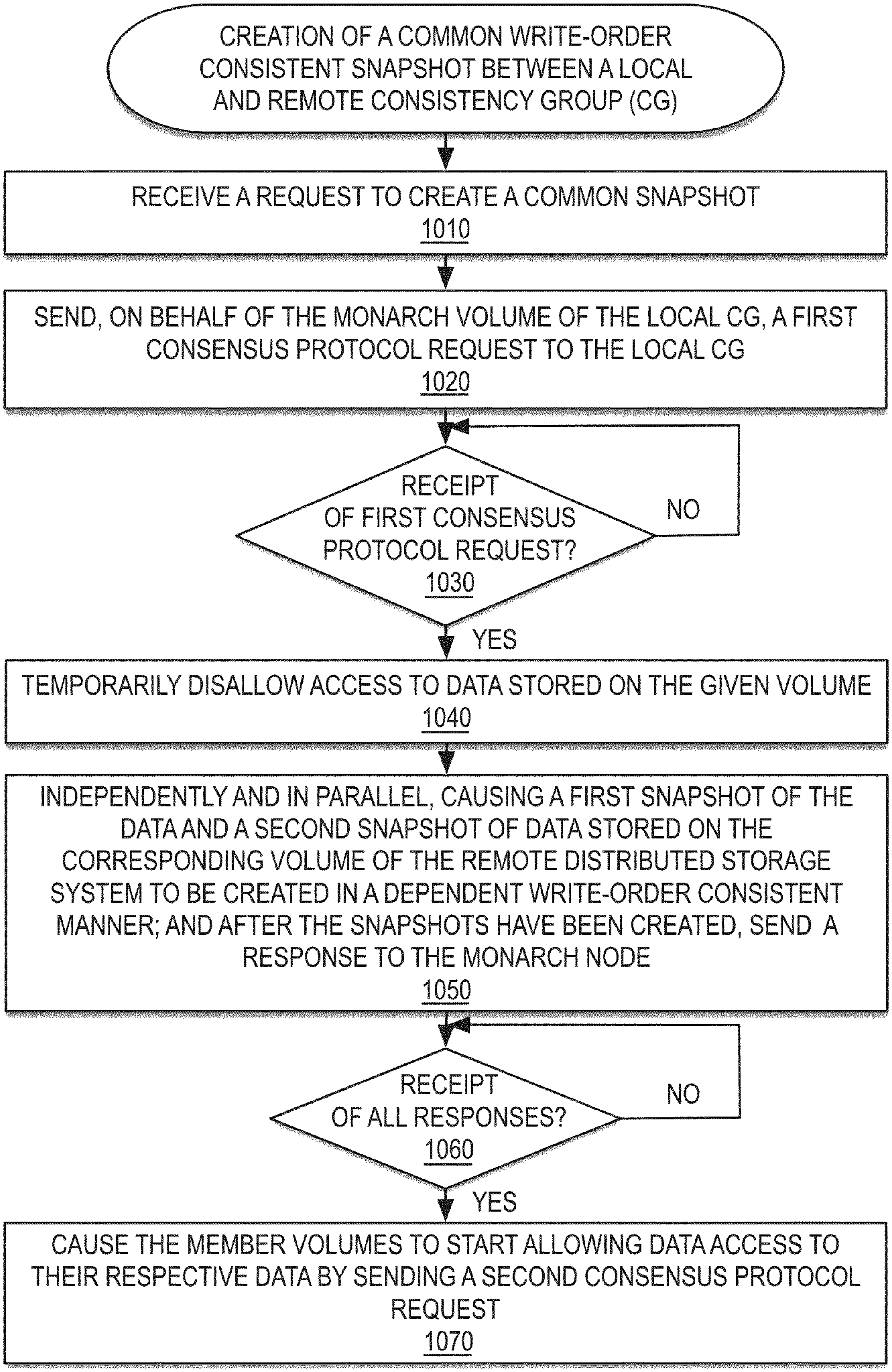
FIG. 10 is a flow diagram illustrating a set of operations for creation of a common write-order consistent snapshot between a local and a remote CG in accordance with an embodiment of the present disclosure.

FIG. 10 is a flow diagram illustrating a set of operations for creation of a common write-order consistent snapshot between a local and a remote CG in accordance with an embodiment of the present disclosure. At block 1010, a request is received to create a common snapshot. The request may be responsive to a request by an application or may be in anticipation of a planned disruptive operation (e.g., moving a volume member or a system upgrade).

At block 1020, a first consensus protocol request is sent on behalf of a first volume of the member volumes of the local CG to the local CG. According to one embodiment, the first volume represents the monarch volume and the node hosting this volume (the monarch node) may orchestrate the process.

At decision block 1030, it is determined whether the first consensus protocol request has been received on behalf of a given member volume of the local CG. If so, processing continues with block 1040; otherwise, processing loops back to decision block 1030.

At block 1040, responsive to receipt of the first consensus protocol request on behalf of a given member volume access to data stored on the given volume is temporarily disallowed.

At block 1050, a first snapshot of the data stored on the given volume and a second snapshot of the data stored on the peer volume of the corresponding remote CG the remote distributed storage system are created independently and in parallel in a dependent write-order consistent manner. After the snapshots have been created, the monarch node may be notified by sending a response to the monarch node.

At decision block 1060, it is determined by the monarch node whether all responses have been received. If so, processing continues with block 1070; otherwise processing loops back to decision block 1060.

At decision block 1070, the member volumes are caused by the monarch node to start allowing data access to their respective data by causing a second consensus protocol request to be broadcast to the local CG.

According to one embodiment, an example of an optimization that may be performed as part of the above snapshot creation involves flushing out a file system buffer cache to disk only once on behalf of all member volumes residing in the same aggregate (e.g., set of disks). Consider, for example, a CG with member volumes v1-v10, where v1-v5 are on aggregate #1 (e.g., disk set1) and v6-v10 are on aggregate #2 (e.g., disk set 2). In this situation, creation of a common snapshot involves a snapshot create request being initiated for all member volumes (v1-v10) and the monarch node may be the node orchestrating this distributed process and will return to the caller with a success or failure upon completion of snapshot creation on all 10 member volumes. Continuing with this example, in which there are two aggregates (disk sets) involved in this CG snapshot creation process, this particular optimization would involve only 2 flushes—one for disk set1 and another for disk set 2. Alternatively, a sub-optimal implementation would be to flush the file system buffer cache for each volume, which would result in increased load on the system.

While in the context of the example described above it is assumed the common Write-order consistent snapshot is for all member volumes of a particular CG, it is noted that replication of such a snapshot may be performed as a lower level of granularity, for example, including only a partial set of member volumes of the particular CG.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 11:
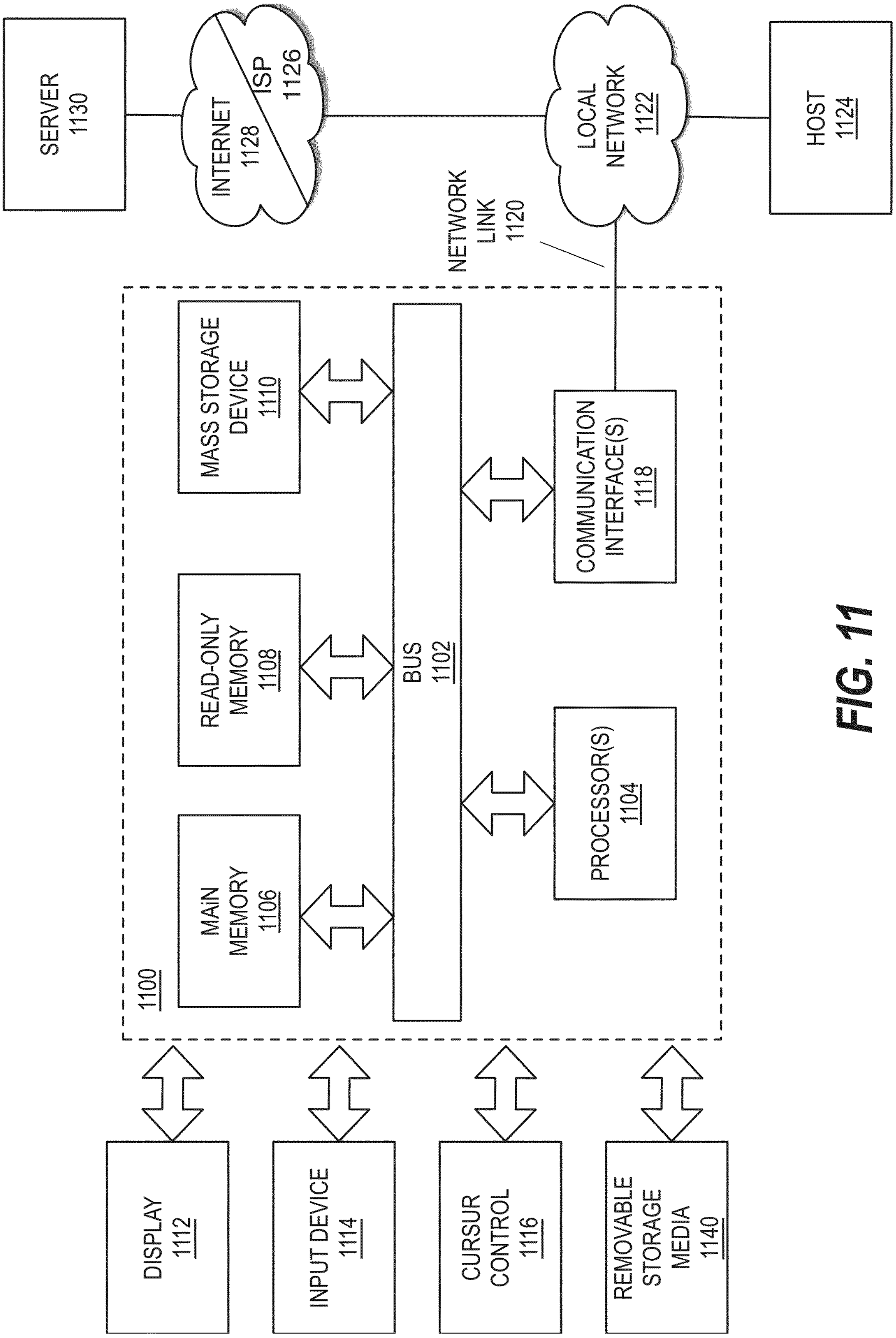
FIG. 11 illustrates an example computer system in which or with which embodiments of the present disclosure may be utilized.

FIG. 11 is a block diagram that illustrates a computer system 1100 in which or with which an embodiment of the present disclosure may be implemented. Computer system 1100 may be representative of all or a portion of the computing resources associated with a node (e.g., storage nodes 136*a-n* or storage nodes 146*a-n*) of a distributed storage system (e.g., cluster 235 or 245) or an administrative workstation (e.g., computer system 110 or 210). Notably, components of computer system 1100 described herein are meant only to exemplify various possibilities. In no way should example computer system 1100 limit the scope of the present disclosure. In the context of the present example, computer system 1100 includes a bus 1102 or other communication mechanism for communicating information, and a processing resource (e.g., a hardware processor 1104) coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, e.g., a magnetic disk, optical disk or flash disk (made of flash memory chips), is provided and coupled to bus 1102 for storing information and instructions.

Computer system 1100 may be coupled via bus 1102 to a display 1112, e.g., a cathode ray tube (CRT), Liquid Crystal Display (LCD), Organic Light-Emitting Diode Display (OLED), Digital Light Processing Display (DLP) or the like, for displaying information to a computer user. An input device 1114, including alphanumeric and other keys, is coupled to bus 1102 for communicating information and command selections to processor 1104. Another type of user input device is cursor control 1116, such as a mouse, a trackball, a trackpad, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Removable storage media 1140 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1100 may implement the techniques described herein using customized hard-wired logic, one or more ASICs or FPGAs, firmware or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1110. Volatile media includes dynamic memory, such as main memory 1106. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world-wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, or stored in storage device 1110, or other non-volatile storage for later execution.

Figure 12:
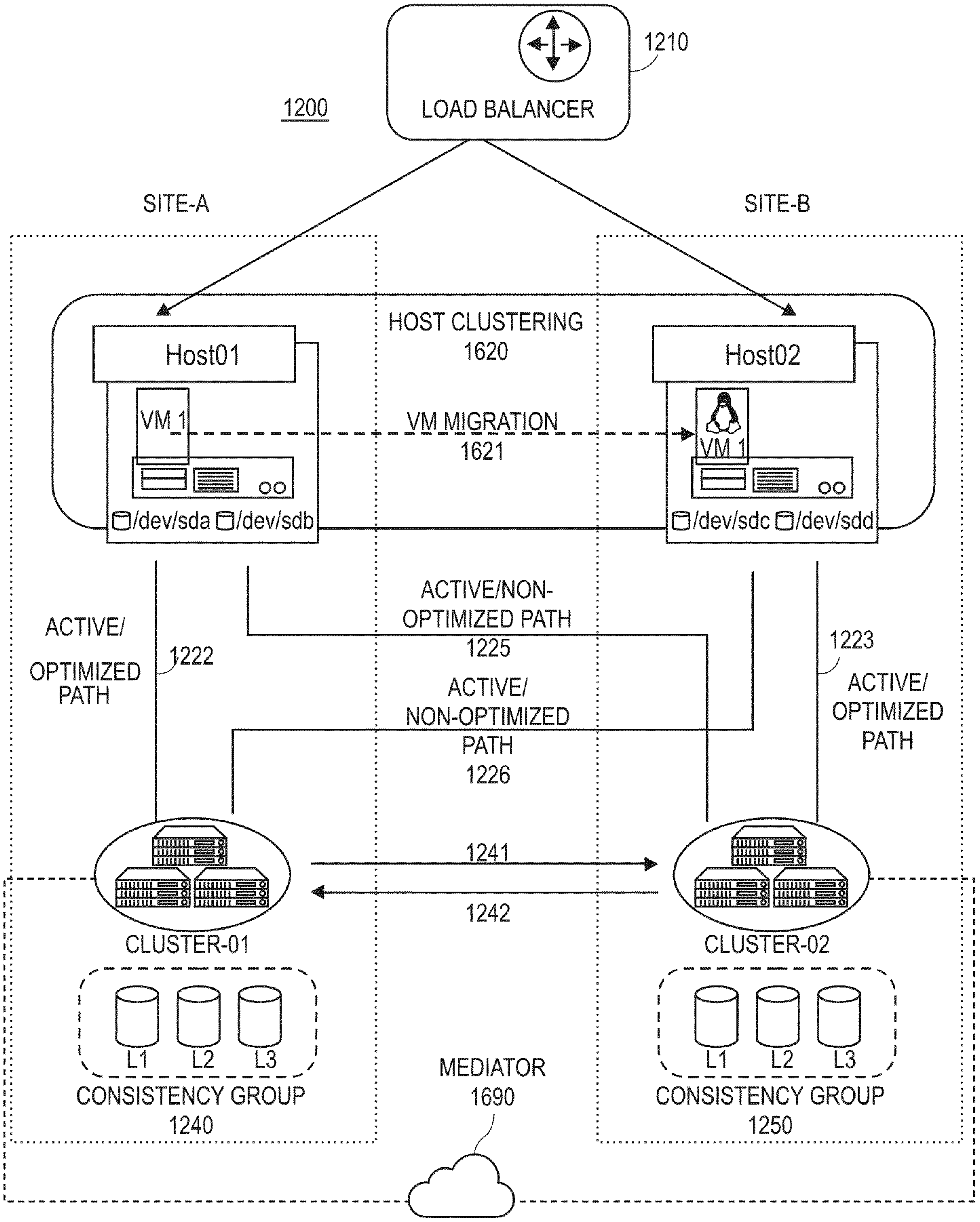
FIG. 12 is a block diagram illustrating a virtualized environment in which various embodiments may be implemented (e.g., virtual storage nodes of a primary storage site, a secondary storage site, etc.).

FIG. 12 is a block diagram illustrating a virtualized environment in which various embodiments may be implemented (e.g., virtual storage nodes of a primary storage site, a secondary storage site, etc.). In various examples described herein, a virtual storage system 1200 may be run (e.g., on a VM or as a containerized instance, as the case may be) within a public cloud provider. In the context of the present example, the virtual storage system 1200 includes a management server appliance 1210, a host clustering 1220 that includes host 01 and a host 02, and clusters 01 and 02. Cluster 01 includes a consistency group 1240 with L1, L2, and L3 storage members. Cluster 02 includes a consistency group 1250 with L1, L2, and L3 storage members.

To create a virtualized high availability host clustering 1220 across two sites A and B, hosts are used and managed by a server appliance 1210. The virtual machine (VM-1) can be migrated with VM migration 1221 from host 01 to host 02. The server appliance 1210 is a centralized management system that enables administrators to effectively operate hosts in host clusters. The server appliance 1210 facilitates key functions such as VM provisioning, High Availability (HA), Distributed Resource Scheduler (DRS), Kubernetes Grid, and more. It is an important component in cloud environments.

The virtual storage system 1200 provides advanced business continuity if one or more failure domains suffer a total outage. The virtual storage system 1200 may present storage over a network to clients using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients may request services of the virtual storage system 1600 by issuing Input/Output requests (e.g., file system protocol messages (in the form of packets) over the network). A representative client may comprise an application, such as a database application, executing on a computer that “connects” to the virtual storage system over a computer network, such as a point-to-point channel, a shared local area network (LAN), a wide area network (WAN), or a virtual private network (VPN) implemented over a public network, such as the Internet.

In the context of the present example, the clusters 01 and 02 each include virtual storage nodes with each virtual storage node including an operating system. The storage nodes can include storage device drivers for transmission of messages and data via the one or more links 1241 and 1242.

The data served by the virtual storage nodes may be distributed across multiple storage units embodied as persistent storage devices (e.g., non-volatile memory), including but not limited to HDDs, SSDs, flash memory systems, or other storage devices.

The clusters 01 and 02 enable business services to continue operating even through a complete site failure, supporting applications to fail over transparently using a secondary copy. Neither manual intervention nor custom scripting are required to trigger a failover with active sync. The active sync supports a symmetric active active capability, enabling read and write I/O operations from both copies of a protected LUN (e.g., L1, L2, L3) with bidirectional synchronous replication, enabling both LUN copies to serve I/O operations locally.

A data protection relationship to protect for business continuity is created between the source storage system (e.g., cluster 01) and destination storage system (e.g., cluster 02), by adding the application specific LUNs from different volumes within a storage virtual machine (SVM) to the consistency group. Under normal operations, the enterprise application writes to the primary consistency group (e.g., CG 1240), which synchronously replicates this I/O to the mirror consistency group (e.g., CG 1250). Even though two separate copies of the data exist in the data protection relationship, because active sync maintains the same LUN identity, the application host sees this as a shared virtual device with multiple paths (e.g., active/optimized paths 1222, 1223; active/non-optimized path 1225, 1226) while only one LUN copy is being written to at a time. Active Optimized paths are a path state in ALUA (Asymmetric Logical Unit Access) where the target storage system responds to I/O requests using the most efficient path. In this case, the active/optimized path 1222 is between host 01 and cluster 01 at site A while the active/optimized path 1223 is between host 02 and cluster 02 at site B. The active non-optimized paths 1225 and 1226 are between different sites. This results in higher performance and reduced latency.

When a failure renders the primary storage system offline, the operating system detects this failure and uses the Mediator 1290 for reconfirmation. If neither the operating system nor the Mediator 1290 are able to ping the primary site with cluster 01, the operating system performs the automatic failover operation. This process results in failing over only a specific application without the need for the manual intervention or scripting which was previously required for the purpose of failover.

The external Mediator 1290 is external from sites A and B and installed in a third failure domain, distinct from the two distinct failure domains of the clusters 01 and 02. The Mediator 1290 acts as a passive witness to active sync copies. In the event of a network partition or unavailability of one copy, active sync uses Mediator 1290 to determine which copy continues to serve I/O, while discontinuing I/O on the other copy. The Mediator 1290 plays a crucial role in active sync configurations as a passive quorum witness, ensuring quorum maintenance and facilitating data access during failures. It acts as a ping proxy for controllers to determine liveliness of peer controllers. Although the Mediator does not actively trigger switchover operations, it provides a vital function by allowing the surviving node to check its partner’s status during network communication issues. In its role as a quorum witness, the Mediator provides an alternate path (effectively serving as a proxy) to the peer cluster.

Furthermore, the Mediator allows clusters to get this information as part of the quorum process. The Mediator 1290 utilizes the node management LIF and cluster management LIF for communication purposes. The Mediator 1290 establishes redundant connections through multiple paths to differentiate between site failure and InterSwitch Link (ISL) failure. When a cluster loses connection with the Mediator software and all its nodes due to an event, it is considered not reachable. This triggers an alert and enables automated failover to the mirror Consistency Group (CG) in the secondary site, ensuring uninterrupted I/O for the client. The replication data path relies on a heartbeat mechanism, and if a network glitch or event persists beyond a certain period, it can result in heartbeat failures, causing the relationship to go out-of-sync. However, the presence of redundant paths, such as LIF failover to another port, can sustain the heartbeat and prevent such disruptions.

Symmetric Active/Active Storage Solution

A symmetric Active/Active storage solution allows simultaneous read-write access to both a primary copy of data on a primary storage site and a secondary copy of the data on a secondary storage site. The symmetric Active/Active storage solution provides application-granular zero recovery point objective (ZRPO) data protection that prevents any data loss and zero recovery time objective (ZRTO) transparent failover that provides instant recovery in the event of various faults.

The concurrent read/write access to both copies of data in the Active/Active system is facilitated by bi-directional synchronous replication. This means that any write operation (WRITE op) initiated on the primary copy of data on the primary storage site is synchronously replicated to the secondary copy of data on the secondary storage site before a client device receives an acknowledgment (ACK). Similarly, a WRITE op initiated on the secondary storage site is synchronously replicated to the primary storage site before the client device receives an acknowledgment. This bi-directional sync replication ensures that both copies of data are updated and consistent with each other.

Hosts (e.g., H1, H2, Host 01, Host 02) can access storage volumes using either a uniform or non-uniform storage area network (SAN) connectivity topology. A SAN is a computer network that provides access to consolidated, block-level data storage. In a uniform storage access configuration 1300 that is depicted as Configuration-1 in FIG. 13, each host (e.g., H1, H2) has connectivity through all available paths to both storage sites, with cross-site paths stretched across distances. The paths (e.g., 1320-1323, 1330-1333) are displayed as dashed or solid lines between a host and a node (e.g., N1, N2, N3, N4). In a non-uniform storage configuration 1400 depicted as Configuration-2 in FIG. 14, each host connects only to storage nodes on the same site as the location of the host, without any cross-site stretched paths.

When a multipath enabled host is connected for uniform storage access, it will distribute its IOs across the local active/optimized paths based on its path selection policy, such as round robin (RR) or least queue depth (LQD). In cases with no active/optimized paths being available, the host's multipathing software will utilize the active/non-optimized paths to maintain access to the storage volumes of a node.

Active Optimized paths are a path state in ALUA (Asymmetric Logical Unit Access) where the target storage system responds to I/O requests using the most efficient path. In this case, the active/optimized path 1320, 1321 is between host H1 and nodes N1 and N2 at site A while the active/non-optimized path 1322 and 1323 is between host H1 and nodes N3 and N4 at site B. Also, the active/optimized path 1330, 1331 is between host H2 and nodes N3 and N4 at site B while the active/non-optimized path 1332 and 1333 is between host H2 and nodes N1 and N2 at site A. The active non-optimized paths are between different sites.

Figure 14:
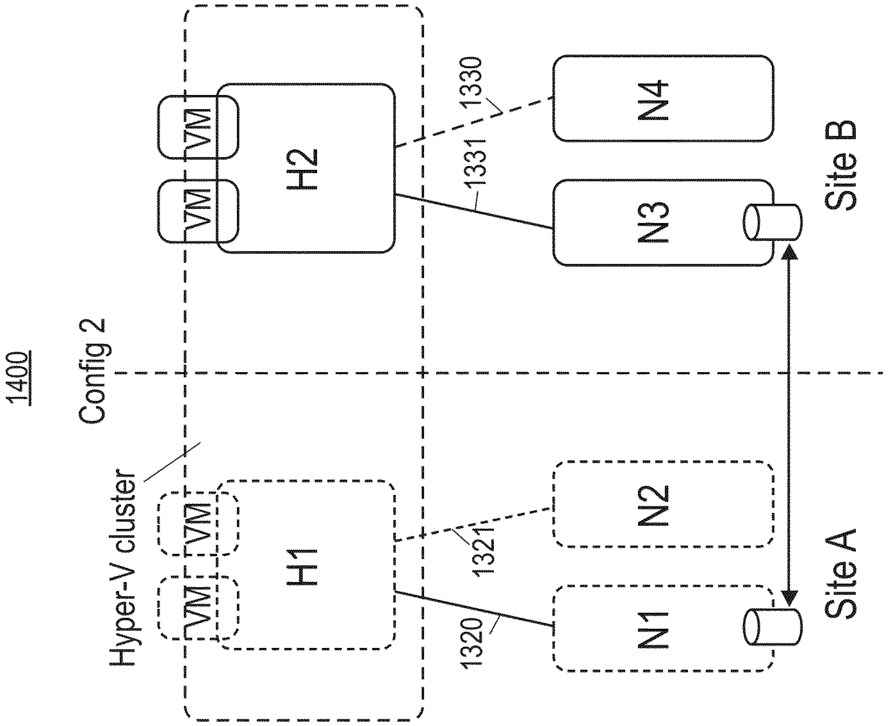
FIG. 14 illustrates a non-uniform storage configuration depicted as Configuration-2 in which each host connects only to storage nodes on the same site as the location of the host, without any cross-site stretched paths in accordance with one embodiment.

In the case of a host connected for non-uniform storage access as illustrated in FIG. 14, the host will distribute its IOs across the local active/optimized paths based on its path selection policy. However, it is important to note that such a host does not have access to the remote storage from a remote storage site.

Designing a fully functional Active/Active multi-site solution with bi-directional replication from an active SAN workload in non-disruptive manner presents several design challenges that needs to be addressed.

In an Active/Active storage solution, both the storage copies should function in read-write mode, unlike a read-write/read-only mode for an Active/Passive solution. Bi-directional replication should guarantee that any changes made to the data on either side are synchronously replicated to the other copy, ensuring that both storage copies remain identical. To achieve optimal performance in active/active environments, it is important that both sites report consistent ALUA state so that all paths are exposed as Active/Optimized path. The present storage solution is able to establish bi-directional replication for existing standalone SAN workload in non-disruptive manner to the hosts and the application and at a same time maintain data consistency across both copies of a data set.

The present storage solution also provides a method for reestablishing the bidirectional replication following persistent faults, such as a prolonged network outage. The present storage solution provides protection at a CG (consistency Group) granularity which typically maps to a software application. When an application deployed across 'n' number volumes are protected using this storage solution, the same number of secondary RO-DP (read only access data protection) volumes are created and mapped against the corresponding primary volumes. Then, a continuity relationship between storage volumes of the primary storage and storage volumes of the secondary storage site is 'initialized' to achieve a steady state of bidirectional sync replication where both primary and secondary volumes can provide simultaneous read-write access.

Figure 15A:
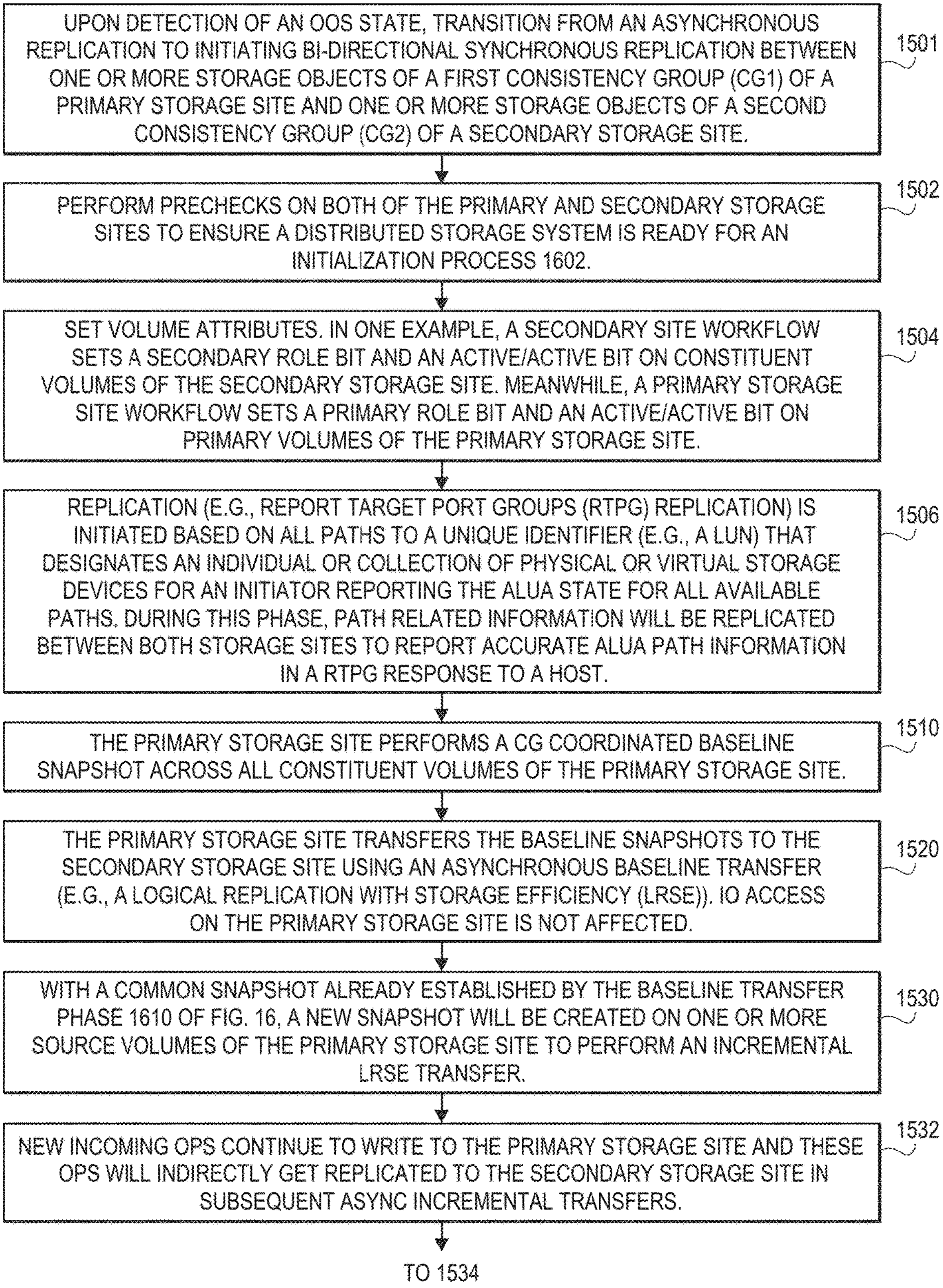
FIGS. 15A, 15B, 15C, and 15D illustrate a set of operations for transitioning from CG asynchronization to bi-directional synchronization in accordance with an embodiment of the present disclosure.
Figure 15B:
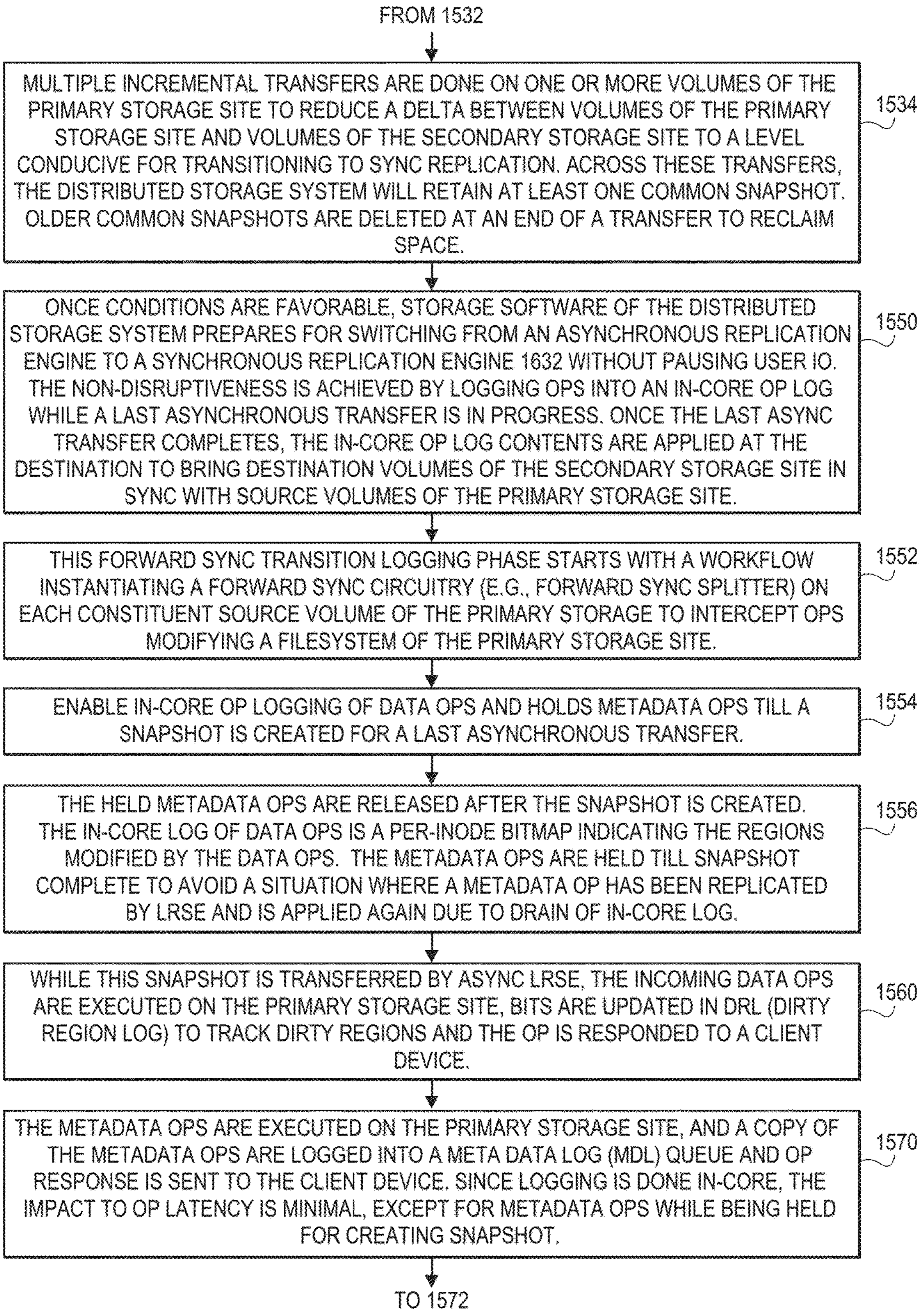
Figure 15C:
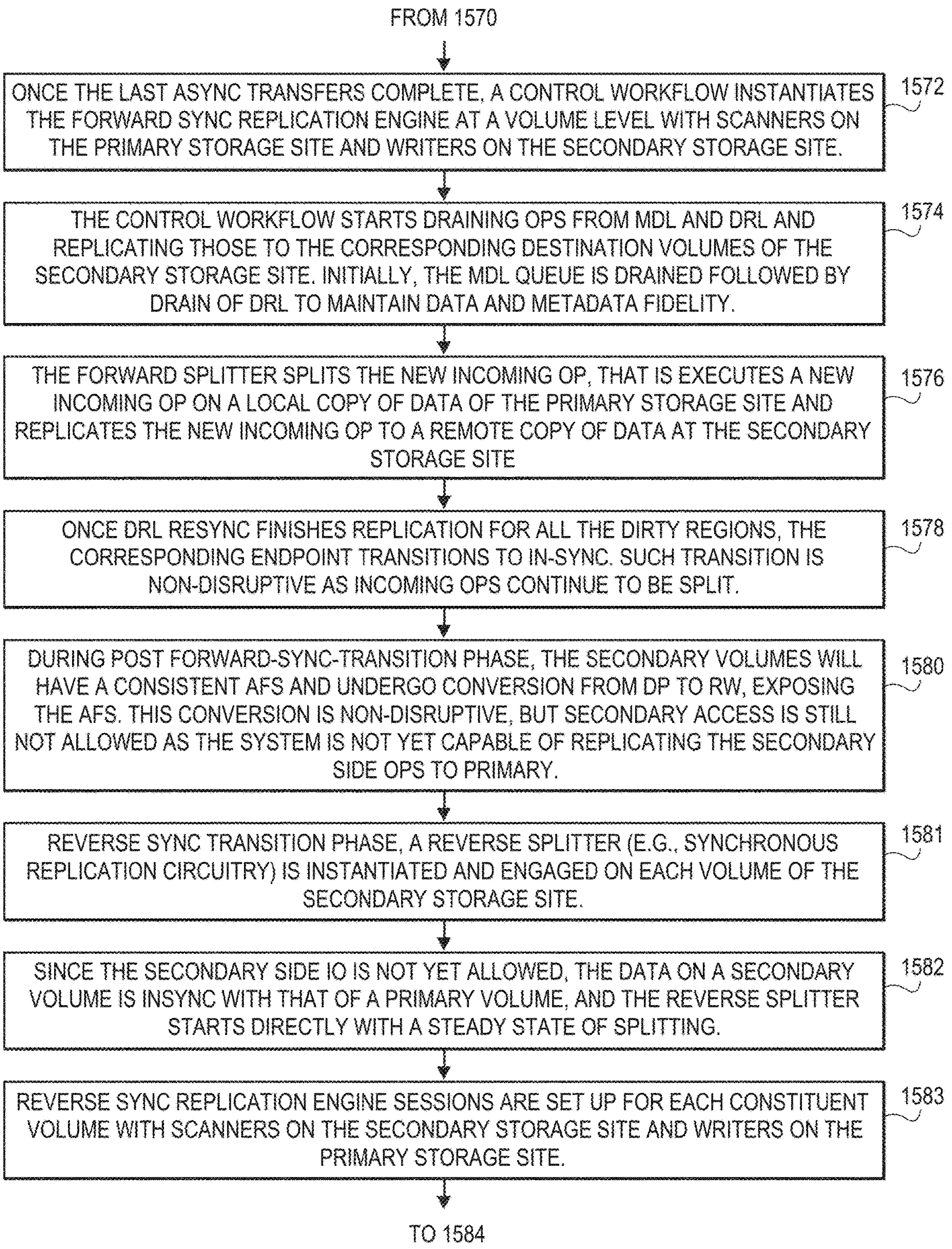
Figure 15D:
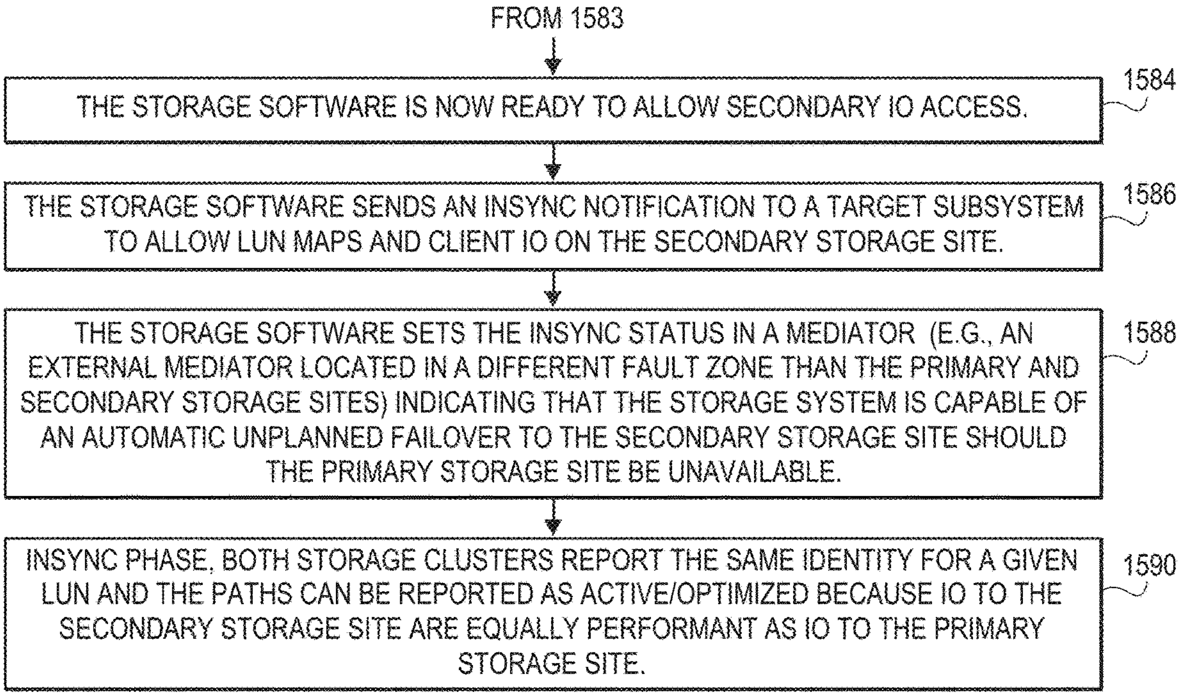
Figure 16:
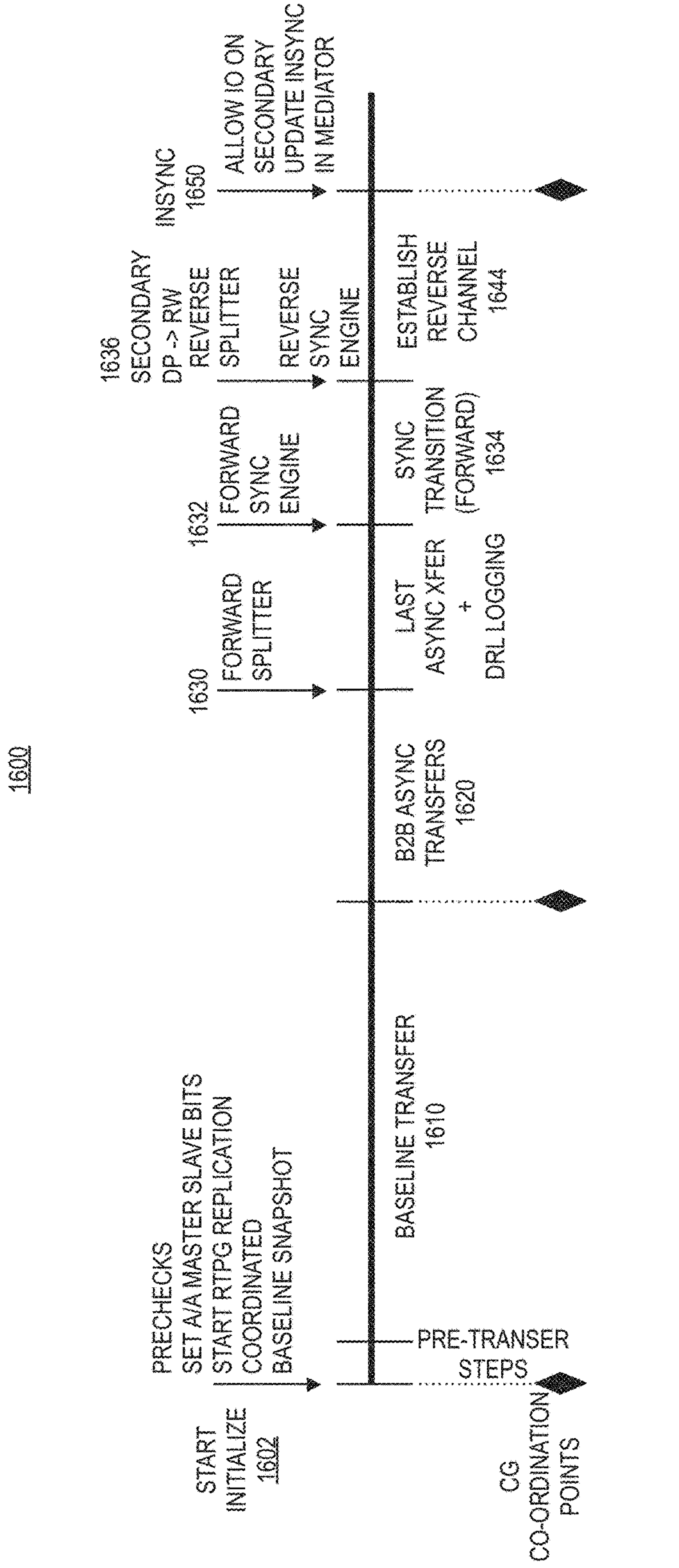
FIG. 16 depicts a timeline for various phases of replications including how the procedure for method 1500 starts and eventually achieves the steady state of bi-directional sync replication in accordance with one embodiment.

The following procedure illustrated as operations in FIG. 15A and FIG. 15B and illustrated as a timeline in FIG. 16 depicts various phases of replications (e.g., forward synchronization from CG1 to CG2, reverse synchronization from CG2 to CG1, etc.) including how the procedure for method 1500 starts and eventually achieves the steady state of bi-directional sync replication. This procedure is driven by an orchestrator module called a control plane module. Each phase is explained in detail below.

FIGS. 15A and 15B illustrate a set of operations for transitioning from CG asynchronization to bi-directional synchronization in accordance with an embodiment of the present disclosure. In the context of the present example, it is assumed a peered pair of CGs, including a local CG (e.g., CG 515*a*) of a distributed storage system (e.g., cluster 510*a*) and a remote CG (e.g., CG 515*b*), has been in an OOS state (e.g., OOS 620) for a period of time, meaning the mirror copy hosted by the member volumes of the remote CG is out-of-synchronization with respect to the primary dataset hosted by the member volumes of the local CG. Depending upon the nature of the data replication being performed (e.g., asynchronous or synchronous) and the particular implementation, a CG resynchronization may be performed responsive to a predetermined event to bring the CG back into an InSync state (e.g., InSync 610).

At operation 1501, the computer-implemented method transitions from an asynchronous replication to initiating bi-directional synchronous replication between one or more storage objects of a first consistency group (CG1) of a primary storage site and one or more storage objects of a second consistency group (CG2) of a secondary storage site. The method can initially establish a bi-directional synchronous replication between CG1 and CG2 or reestablish the bi-directional synchronous replication between CG1 and CG2 due to a predetermined event (e.g., OOS state).

Pre-Baseline Phase

At operation 1502, the computer-implemented method includes prechecks on both of the primary and secondary storage sites to ensure a distributed storage system is ready for an initialization process 1602. At operation 1504, the computer-implemented method sets volume attributes. In one example, a secondary site workflow sets a secondary role bit and an active/active bit on constituent volumes of the secondary storage site. Meanwhile, a primary storage site workflow sets a primary role bit and an active/active bit on primary volumes of the primary storage site.

At operation 1506, replication (e.g., report target port groups (RTPG) replication) is initiated based on all paths to a unique identifier (e.g., a LUN) that designates an individual or collection of physical or virtual storage devices for an initiator reporting the ALUA state for all available paths. It is important that all paths report the same information. Failure to do so can cause hosts to pause I/O awaiting consistency (e.g., an interruption in service). For this reason, it is important that transport services in both storage clusters be able to determine consistent ALUA states for all paths, including paths to LIFs on the remote storage cluster. During this phase, path related information will be replicated between both storage sites to report accurate ALUA path information in a RTPG response to a Host. A special duplex attribute is replicated and seeded to a cache (e.g., a SCSI Target cache) indicating that this replication is for a symmetric active-active relationship. Any disruptive event such as volume move across nodes or node takeover and/or giveback will keep state information up to date in a RTPG cache and the same will be seeded in the target cache. A resiliency model is built across clusters to make sure a Target is notified about the volume and/or path changes.

Async Baseline Transfer Phase 1610

For a Coordinated Snapshot, at operation 1510, the primary storage site performs a CG coordinated baseline snapshot across all constituent volumes of CG1 of the primary storage site. At operation 1520, the primary storage site transfers the baseline snapshots to the secondary storage site using an asynchronous baseline transfer (e.g., a Logical Replication with Storage Efficiency (LRSE)). IO access on the primary storage site is not affected during this async baseline transfer phase.

Async Incremental Transfer Phase 1620

At operation 1530, with a common snapshot already established by the baseline transfer phase 1610 of FIG. 16, a new snapshot will be created on one or more source volumes of the primary storage site to perform an incremental LRSE transfer. At operation 1532, new incoming Ops continue to write to the primary storage site and these Ops will indirectly get replicated to the secondary storage site in subsequent async incremental transfers.

At operation 1534, multiple incremental transfers are done on one or more volumes of the primary storage site to reduce a delta between volumes of the primary storage site and volumes of the secondary storage site to a level conducive for transitioning to sync replication. Across these transfers, the distributed storage system will retain at least one common snapshot. Older common snapshots are deleted at an end of a transfer to reclaim space.

Forward Sync Transition Logging Phase 1634

Once conditions are favorable, at operation 1550, storage software of the distributed storage system prepares for switching from an asynchronous replication engine to a synchronous replication engine 1632 without pausing user IO on the primary storage site. The non-disruptiveness is achieved by logging Ops into an in-core memory (e.g., in RAM) Op log while a last asynchronous transfer is in progress. Once the last async transfer completes, the in-core Op log contents are applied at the destination to bring destination volumes of the secondary storage site in sync with source volumes of the primary storage site.

At operation 1552, this forward sync transition logging phase starts with a workflow instantiating a forward sync circuitry (e.g., forward sync splitter) on each constituent source volume of the primary storage to intercept Ops modifying a filesystem of the primary storage site.

Further, at operation 1554, the method enables in-core memory (e.g., in RAM) Op logging of data ops and holds metadata ops until a snapshot is created for a last asynchronous transfer. At operation 1556, the held metadata ops are released after the snapshot is created. The in-core log of data ops is a per-Inode bitmap indicating the regions modified by the data Ops. Data Ops are idempotent whereas metadata Ops are non-idempotent. The metadata ops are held until snapshot complete to avoid a situation where a metadata op has been replicated by LRSE and is applied again due to drain of in-core log.

While this snapshot is transferred by async LRSE, at operation 1560, the incoming data ops are executed on the primary storage site, bits are updated in DRL (Dirty Region Log) to track dirty regions, and the Op is acknowledged to a client device.

At operation 1570, the metadata ops are executed on the primary storage site, and a copy of the metadata Ops are logged into a Meta Data Log (MDL) queue and Op response is sent to the client device. Since logging is done in-core, the impact to Op latency is minimal, except for metadata ops while being held for creating snapshot.

Forward Sync Transition Drain Phase

Once the last async transfers complete, at operation 1572, a control workflow of a control module instantiates the forward sync replication engine at a volume level with scanners on the primary storage site and writers on the secondary storage site. Further, at operation 1574, the control workflow starts draining Ops from MDL and DRL and replicating those to the corresponding destination volumes of the secondary storage site. Initially, the MDL queue is drained followed by drain of DRL to maintain data and metadata fidelity.

At operation 1576, the forward splitter (e.g., forward splitter 1630 from FIG. 16) splits the new incoming Op, that is executes a new incoming Op on a local copy of data of CG1 of the primary storage site and replicates the new incoming Op to a remote copy of data of CG2 at the secondary storage site. For data ops, it is acceptable that an overlap exists between a change tracking log and a last incremental snapshot. This guarantees that no changes on a source side of CG1 would escape a transition phase. If an incoming Op falls on a region that is already dirty, the Op writes to the primary storage site without splitting and relies on DRL resync to transfer the dirty region to the secondary storage site. However, if an incoming Op falls on a region that is not dirty, then the incoming Op is executed on the local copy of the data and is replicated to the remote copy of the data. Thus, both splitting and DRL resyncing happen concurrently. It is possible that a Splitter and DRL Resync may collide for the same region. In case DRL resync gets hold of the region first, this can cause additional latency for the affected incoming Op as its splitting cannot proceed until DRL resync for the same region is complete.

At operation 1578, once DRL resync finishes replication for all the dirty regions, the corresponding endpoint transitions to in-sync. Such transition is non-disruptive as incoming Ops continue to be split.

Post Forward Sync Transition Phase

Note that volumes of the secondary storage site remain DP (Data Protection Read Only access or Data Protection Read Only capability) during async and sync transition phases and their AFS (Active File Systems) may not be write-order-consistent. For these reasons, client access to the secondary storage site is not allowed in this window.

During Post Forward-Sync-Transition phase 1636, at operation 1580, the secondary volumes will have a consistent AFS and undergo conversion from DP to read write access (RW) or read write capability, exposing the AFS. This conversion is non-disruptive, but secondary access is still not allowed as the storage system is not yet capable of replicating the secondary side Ops to the primary storage site.

Reverse Sync Transition Phase 1644

In this phase, at operation 1581, a reverse Splitter (e.g., synchronous replication circuitry) is instantiated and engaged on each volume of the secondary storage site. Since the secondary side IO on the secondary storage site is not yet allowed, the data on a secondary volume is InSync with that of a primary volume, and the reverse splitter starts directly with a steady state of 'splitting' at operation 1582. In other words, there is no need for baseline transfer, async transfers and async-to-sync transition in the reverse direction. Further, at operation 1583, reverse sync replication engine sessions are set up for each constituent volume with scanners on the secondary storage site and writers on the primary storage site. At operation 1584, the storage software is now ready to allow secondary IO access. Then, at operation 1586, the storage software sends an InSync notification to a SCSI-Target subsystem to allow LUN maps and client IO on the secondary storage site. At operation 1588, the storage software sets the InSync status in a mediator (e.g., an external mediator located in a different fault domain than the primary and secondary storage sites) indicating that the storage system is capable of an automatic unplanned failover to the secondary storage site should the primary storage site be unavailable.

InSync Phase 1650

Figure 13:
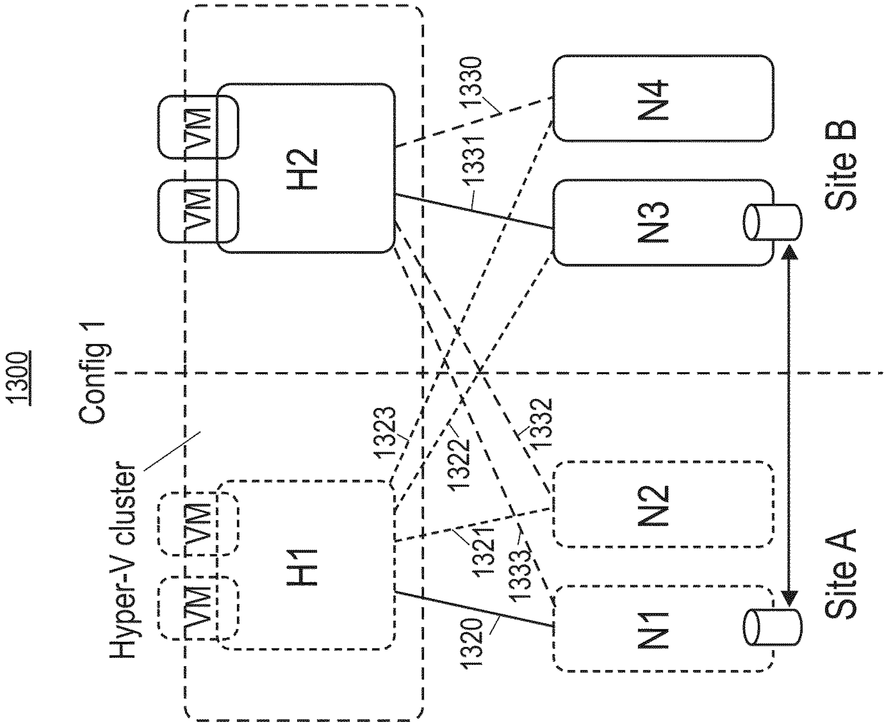
FIG. 13 illustrates a uniform storage access configuration that is depicted as Configuration-1 in accordance with one embodiment.

At operation 1590, both storage clusters of the primary and secondary storage sites report the same identity for a given LUN and the paths can be reported as Active/Optimized because IO Ops to the secondary storage site are equally performant as IO Ops to the primary storage site. When deployed in a Uniform configuration as illustrated in FIG. 13, a host can access the same LUN through both the local storage and the remote storage. For non-Uniform deployments of FIG. 14, the host will have only access to the local storage.

Bi-Directional Sync Replication

In the steady state, a splitter will be splitting IOs synchronously and a writer will be accepting replicated IOs at both endpoints of the Active/Active multi-site storage solution. The forward and reverse transfer engine sessions enable splitters to talk to their corresponding writers. Incoming ops directed to any site will have a splitter splitting ops to a local file system and marshal the Op to send it across to a remote storage site over a network connection (e.g., Ethernet). On the other end at a destination volume of a remote site, the writer will un-marshal this request and send the request to the remote file system.

This means that any write operation (WRITE op) initiated on the primary copy of data is synchronously replicated to the secondary copy of data before the client device receives an acknowledgment (ACK). Similarly, a WRITE op initiated on the secondary copy of data is synchronously replicated to the primary copy of data before the client device receives an ACK. This bi-directional sync replication ensures that both copies are always updated and consistent with each other.

Reestablishing Replication Following an Out-of-Sync

The transfer engine sessions between the primary and secondary volume pairs can get disrupted due to various planned operations like volume move or unplanned failures like a storage system crash. The storage software recovers from such transient faults using an Op journaling based recovery. However, in case of prolonged faults like an inter-cluster network outage, the distributed storage system recovers using a snapshot-based auto-resync. This is like an 'initialize' workflow, except for minor differences. For instance, the auto-resync takes a pre-transfer snapshot to preserve the latest available data (AFS) before restoring it to a last common snapshot between the primary and secondary storage sites. Also, a baseline transfer is not needed in case of resync as a common snapshot is guaranteed to be available at any point in time.

According to some embodiments for Example 1, a computer-implemented method performed by one or more processing resources of a distributed storage system, the computer-implemented method comprises transitioning from an asynchronous replication to initiating bi-directional synchronous replication including a forward synchronization process from one or more storage objects of a first consistency group (CG1) of a primary storage site to one or more storage objects of a second consistency group (CG2) of a secondary storage site; converting the one or more storage objects of the CG2 from data protection read only access to read write access, and performing a reverse synchronization process from the one or more storage objects of the CG2 to the one or more storage objects of the CG1 including instantiating a reverse splitter on each volume of CG2, establishing reverse sync replication sessions for each storage object of the CG2, and allowing input output (IO) access to the one or more storage objects of the CG2.

Example 2 includes the subject matter of Example 1, wherein the reverse synchronization process is performed without a baseline transfer, async transfers, and async-to-sync transition in a reverse direction from the one or more storage objects of the CG2 to the one or more storage objects of the CG1.

Example 3 includes the subject matter of any of Examples 1-2, the method further comprises sending an InSync notification to a target subsystem to allow logical unit number (LUN) maps and client IO on the secondary storage site.

Example 4 includes the subject matter of any of Examples 1-3, the method further comprises setting an InSync status in a mediator that is located in a different fault domain than the primary and secondary storage sites, wherein the InSync status indicates that the distributed storage system is capable of an automatic unplanned failover to the secondary storage site should the primary storage site be unavailable.

Example 5 includes the subject matter of any of Examples 1-4, the method further comprises performing an InSync phase in which the primary and secondary storage sites report a same identity for a given logical unit number for one or more storage objects and available paths are capable of being reported as Active/Optimized because IO operations to the secondary storage site are equally performant as IO operations to the primary storage site.

Example 6 includes the subject matter of any of Examples 1-5, the method further comprises upon performing the InSync phase, establishing bi-directional synchronous replication between one or more storage objects of a first consistency group (CG1) of a primary storage site and one or more storage objects of a second consistency group (CG2) of a secondary storage site with each storage site having read/write access while maintaining zero recovery point objective (RPO) and Zero recovery time objective (RTO).

Example 7 includes the subject matter of any of Examples 1-6, the method further comprises performing an asynchronous baseline snapshot transfer process to capture a CG coordinated baseline snapshot for the one or more storage objects of the CG1 and to transfer the baseline snapshots to the one or more storage objects of the CG2.

Some embodiments relate to Example 8 that includes a non-transitory computer-readable storage medium embodying a set of instructions, which when executed by one or more processing resources of a multi-site distributed storage system cause the one or more processing resources to transition from an asynchronous replication to initiating bi-directional synchronous replication including a forward synchronization process from one or more storage objects of a first consistency group (CG1) of a primary storage site to one or more storage objects of a second consistency group (CG2) of a secondary storage site, convert the one or more storage objects of the CG2 from data protection read only access to read write access, and perform a reverse synchronization process from the one or more storage objects of the CG2 to the one or more storage objects of the CG1 including instantiating a reverse splitter on each volume of CG2, establishing reverse sync replication sessions for each storage object of the CG2, and allowing input output (IO) access to the one or more storage objects of the CG2.

Example 9 includes the subject matter of Example 8, wherein the reverse synchronization process is performed without a baseline transfer, async transfers, and async-to-sync transition in a reverse direction from the one or more storage objects of the CG2 to the one or more storage objects of the CG1.

Example 10 includes the subject matter of any of Examples 8-9, wherein the instructions when executed by the one or more processing resources cause the one or more processing resources to send an InSync notification to a target subsystem to allow logical unit number (LUN) maps and client IO on the secondary storage site.

Example 11 includes the subject matter of any of Examples 8-10, wherein the instructions when executed by the one or more processing resources cause the one or more processing resources to set an InSync status in a mediator that is located in a different fault zone than the primary and secondary storage sites, wherein the InSync status indicates that the distributed storage system is capable of an automatic unplanned failover to the secondary storage site should the primary storage site be unavailable.

Example 12 includes the subject matter of any of Examples 8-11, wherein the instructions when executed by the one or more processing resources cause the one or more processing resources to perform an InSync phase in which the primary and secondary storage sites report a same identity for a given logical unit number for one or more storage objects and available paths are capable of being reported as Active/Optimized because IO operations to the secondary storage site are equally performant as IO operations to the primary storage site.

Example 13 includes the subject matter of any of Examples 8-12, wherein the instructions when executed by the one or more processing resources cause the one or more processing resources to upon performing the InSync phase, establish bi-directional synchronous replication between one or more storage objects of a first consistency group (CG1) of a primary storage site and one or more storage objects of a second consistency group (CG2) of a secondary storage site with each storage site having read/write access while maintaining zero recovery point objective (RPO) and Zero recovery time objective (RTO).

Example 14 includes the subject matter of any of Examples 8-9, wherein the instructions when executed by the one or more processing resources cause the one or more processing resources to perform an asynchronous baseline snapshot transfer process to capture a CG coordinated baseline snapshot for the one or more storage objects of the CG1 and to transfer the baseline snapshots to the one or more storage objects of the CG2.

Some embodiments relate to Example 15 that is a multi-site distributed storage system having a primary storage site with a primary storage cluster and a secondary storage site with a secondary storage cluster. The multi-site distributed storage system comprises one or more processing resources and a non-transitory computer-readable medium coupled to the one or more processing resources, having stored therein instructions, which when executed by the one or more processing resources cause the one or more processing resources to transition from an asynchronous replication to initiating bi-directional synchronous replication including a forward synchronization process from one or more storage objects of a first consistency group (CG1) of a primary storage site to one or more storage objects of a second consistency group (CG2) of a secondary storage site, convert the one or more storage objects of the CG2 from data protection read only access to read write access, and perform a reverse synchronization process from the one or more storage objects of the CG2 to the one or more storage objects of the CG1 including instantiating a reverse splitter on each volume of CG2, establishing reverse sync replication sessions for each storage object of the CG2, and allowing input output (IO) access to the one or more storage objects of the CG2.

Example 16 includes the subject matter of Example 15, wherein the reverse synchronization process is performed without a baseline transfer, async transfers, and async-to-sync transition in a reverse direction from the one or more storage objects of the CG2 to the one or more storage objects of the CG1.

Example 17 includes the subject matter of any of Examples 15-16, wherein the instructions when executed by the one or more processing resources cause the one or more processing resources to send an InSync notification to a target subsystem to allow logical unit number (LUN) maps and client IO on the secondary storage site.

Example 18 includes the subject matter of any of Examples 15-17, wherein the instructions when executed by the one or more processing resources cause the one or more processing resources to set an InSync status in a mediator that is located in a different fault zone than the primary and secondary storage sites, wherein the InSync status indicates that the distributed storage system is capable of an automatic unplanned failover to the secondary storage site should the primary storage site be unavailable.

Example 19 includes the subject matter of any of Examples 15-18, wherein the instructions when executed by the one or more processing resources cause the one or more processing resources to perform an InSync phase in which the primary and secondary storage sites report a same identity for a given logical unique number for one or more storage objects and available paths are capable of being reported as Active/Optimized because IO operations to the secondary storage site are equally performant as IO operations to the primary storage site.

Example 20 includes the subject matter of any of Examples 15-19, wherein the instructions when executed by the one or more processing resources cause the one or more processing resources to upon performing the InSync phase, establish bi-directional synchronous replication between one or more storage objects of a first consistency group (CG1) of a primary storage site and one or more storage objects of a second consistency group (CG2) of a secondary storage site with each storage site having read/write access while maintaining zero recovery point objective (RPO) and Zero recovery time objective (RTO).

What is claimed is:

1. A computer-implemented method performed by one or more processing resources of a distributed storage system, the computer-implemented method comprising:
 transitioning from an asynchronous replication to initiating bi-directional synchronous replication including a forward synchronization process from one or more storage objects of a first group (G1) of a primary storage site to one or more storage objects of a second group (G2) of a secondary storage site;
 converting the one or more storage objects of the G2 from data protection read only access to read write access; and
 performing a reverse synchronization process from the one or more storage objects of the G2 to the one or more storage objects of the G1 including instantiating a reverse splitter on each volume of G2, establishing reverse sync replication sessions for each storage object of the G2, and allowing input output (IO) access to the one or more storage objects of the G2, wherein the reverse synchronization process is performed without async transfers, and async-to-sync transition in a reverse direction from the one or more storage objects of the G2 to the one or more storage objects of the G1.

2. The computer-implemented method of claim 1, wherein the reverse synchronization process is performed without a baseline transfer, async transfers, and async-to-sync transition in a reverse direction from the one or more storage objects of the G2 to the one or more storage objects of the G1.

3. The computer-implemented method of claim 1, further comprising:
 sending an InSync notification to a target subsystem to allow logical unit number (LUN) maps and client input output (IO) operations on the secondary storage site.

4. The computer-implemented method of claim 1, further comprising:
 setting an InSync status in a mediator that is located in a different fault domain than the primary and secondary storage sites, wherein the InSync status indicates that the distributed storage system is capable of an automatic unplanned failover to the secondary storage site should the primary storage site be unavailable.

5. The computer-implemented method of claim 1, further comprising:
 performing an InSync phase in which the primary and secondary storage sites report a same identity for a given logical unit number for one or more storage objects and available paths are capable of being reported as Active/Optimized because input output (IO) operations to the secondary storage site are equally performant as IO operations to the primary storage site.

6. The computer-implemented method of claim 5, further comprising:
 upon performing the InSync phase, establishing bi-directional synchronous replication between one or more storage objects of the G1 of the primary storage site and one or more storage objects of the G2 of the secondary storage site with each storage site having read/write access while maintaining zero recovery point objective (RPO) and Zero recovery time objective (RTO).

7. The computer-implemented method of claim 1, further comprises:
 performing an asynchronous baseline snapshot transfer process to capture a group coordinated baseline snapshot for the one or more storage objects of the G1 and to transfer the baseline snapshots to the one or more storage objects of the G2.

8. A non-transitory computer-readable storage medium embodying a set of instructions, which when executed by one or more processing resources of a multi-site distributed storage system cause the one or more processing resources to:
 transition from an asynchronous replication to initiating bi-directional synchronous replication including a forward synchronization process from one or more storage objects of a first group (G1) of a primary storage site to one or more storage objects of a second consistency group (CG2) of a secondary storage site;
 convert the one or more storage objects of the G2 from data protection read only access to read write access; and
 perform a reverse synchronization process from the one or more storage objects of the G2 to the one or more storage objects of the G1 including instantiating a reverse splitter on each volume of G2, establishing reverse sync replication sessions for each storage object of the G2, and allowing input output (IO) access to the one or more storage objects of the G2, wherein the reverse synchronization process is performed without async transfers, and async-to-sync transition in a reverse direction from the one or more storage objects of the G2 to the one or more storage objects of the G1.

9. The non-transitory computer-readable storage medium of claim 8, wherein the reverse synchronization process is performed without a baseline transfer, async transfers, and async-to-sync transition in a reverse direction from the one or more storage objects of the G2 to the one or more storage objects of the G1.

10. The non-transitory computer-readable storage medium of claim 8, wherein the instructions when executed by the one or more processing resources cause the one or more processing resources to:
 send an InSync notification to a target subsystem to allow logical unit number (LUN) maps and client input output (IO) operations on the secondary storage site.

11. The non-transitory computer-readable storage medium of claim 8, wherein the instructions when executed by the one or more processing resources cause the one or more processing resources to:
 set an InSync status in a mediator that is located in a different fault zone than the primary and secondary storage sites, wherein the InSync status indicates that the distributed storage system is capable of an automatic unplanned failover to the secondary storage site should the primary storage site be unavailable.

12. The non-transitory computer-readable storage medium of claim 8, wherein the instructions when executed by the one or more processing resources cause the one or more processing resources to:
 perform an InSync phase in which the primary and secondary storage sites report a same identity for a given logical unit number for one or more storage objects and available paths are capable of being reported as Active/Optimized because input output (IO) operations operations to the secondary storage site are equally performant as IO operations to the primary storage site.

13. The non-transitory computer-readable storage medium of claim 12, wherein the instructions when executed by the one or more processing resources cause the one or more processing resources to:

upon performing the InSync phase, establish bi-directional synchronous replication between one or more storage objects of the G1 of the primary storage site and one or more storage objects of the G2 of the secondary storage site with each storage site having read/write access while maintaining zero recovery point objective (RPO) and Zero recovery time objective (RTO).

14. The non-transitory computer-readable storage medium of claim 8, wherein the instructions when executed by the one or more processing resources cause the one or more processing resources to:

perform an asynchronous baseline snapshot transfer process to capture a group coordinated baseline snapshot for the one or more storage objects of the G1 and to transfer the baseline snapshots to the one or more storage objects of the G2.

15. A multi-site distributed storage system having a primary storage site with a primary storage cluster and a secondary storage site with a secondary storage cluster, comprising:

one or more processing resources; and a non-transitory computer-readable medium coupled to the one or more processing resources, having stored therein instructions, which when executed by the one or more processing resources cause the one or more processing resources to:

transition from an asynchronous replication to initiating bi-directional synchronous replication including a forward synchronization process from one or more storage objects of a first group (G1) of a primary storage site to one or more storage objects of a second group (G2) of a secondary storage site;

convert the one or more storage objects of the G2 from data protection read only access to read write access; and perform a reverse synchronization process from the one or more storage objects of the G2 to the one or more storage objects of the G1 including instantiating a reverse splitter on each volume of G2, establishing reverse sync replication sessions for each storage object of the G2, and allowing input output (IO) access to the one or more storage objects of the G2, wherein the reverse synchronization process is performed without async transfers, and async-to-sync transition in a reverse direction from the one or more storage objects of the G2 to the one or more storage objects of the G1.

16. The multi-site distributed storage system of claim 15, wherein the reverse synchronization process is performed without a baseline transfer, async transfers, and async-to-sync transition in a reverse direction from the one or more storage objects of the G2 to the one or more storage objects of the G1.

17. The multi-site distributed storage system of claim 16, wherein the instructions when executed by the one or more processing resources cause the one or more processing resources to:

send an InSync notification to a target subsystem to allow logical unit number (LUN) maps and client input output (IO) operations on the secondary storage site.

18. The multi-site distributed storage system of claim 15, wherein the instructions when executed by the one or more processing resources cause the one or more processing resources to:

set an InSync status in a mediator that is located in a different fault zone than the primary and secondary storage sites, wherein the InSync status indicates that the distributed storage system is capable of an automatic unplanned failover to the secondary storage site should the primary storage site be unavailable.

19. The multi-site distributed storage system of claim 15, wherein the instructions when executed by the one or more processing resources cause the one or more processing resources to:

perform an InSync phase in which the primary and secondary storage sites report a same identity for a given logical unique number for one or more storage objects and available paths are capable of being reported as Active/Optimized because input output (IO) operations to the secondary storage site are equally performant as IO operations to the primary storage site.

20. The multi-site distributed storage system of claim 19, wherein the instructions when executed by the one or more processing resources cause the one or more processing resources to:

upon performing the InSync phase, establish bi-directional synchronous replication between one or more storage objects of the G1 of the primary storage site and one or more storage objects of the G2 of the secondary storage site with each storage site having read/write access while maintaining zero recovery point objective (RPO) and Zero recovery time objective (RTO).

* * * * *